US 9,854,270 B2

United States Patent
Ramasubramonian et al.

(10) Patent No.: US 9,854,270 B2
(45) Date of Patent: Dec. 26, 2017

(54) DEVICE AND METHOD FOR SCALABLE CODING OF VIDEO INFORMATION

(71) Applicant: QUALCOMM Incorporated, San Diego, CA (US)

(72) Inventors: Adarsh Krishnan Ramasubramonian, San Diego, CA (US); Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 14/575,788

(22) Filed: Dec. 18, 2014

(65) Prior Publication Data

US 2015/0181233 A1    Jun. 25, 2015

Related U.S. Application Data

(60) Provisional application No. 61/918,630, filed on Dec. 19, 2013.

(51) Int. Cl.
| | |
|---|---|
| *H04N 7/12* | (2006.01) |
| *H04N 11/02* | (2006.01) |
| *H04N 11/04* | (2006.01) |
| *H04N 19/597* | (2014.01) |
| *H04N 19/52* | (2014.01) |
| *H04N 19/70* | (2014.01) |
| *H04N 19/463* | (2014.01) |

(52) U.S. Cl.
CPC ......... *H04N 19/597* (2014.11); *H04N 19/463* (2014.11); *H04N 19/52* (2014.11); *H04N 19/70* (2014.11)

(58) Field of Classification Search
CPC ........................................................ H04N 7/50
See application file for complete search history.

(56) References Cited

U.S. PATENT DOCUMENTS

| | | | | |
|---|---|---|---|---|
| 2013/0208792 | A1* | 8/2013 | He | H04N 19/00569 375/240.12 |
| 2015/0043656 | A1* | 2/2015 | Choi | H04N 19/597 375/240.26 |

OTHER PUBLICATIONS

Choi B. et al., "MV-HEVC/SHVC HLS: Alignment of picture order counts," 6. JCT-3V Meeting; Oct. 25, 2013-Nov. 1, 2013; Geneva; (The Joint Collaborative Team on 3D Video Coding Extension Development of ISO/IEC JTC/SC29/WG11 and ITU-T SG. 16).*

(Continued)

*Primary Examiner* — Chikaodili E Anyikire
(74) *Attorney, Agent, or Firm* — Knobbe, Martens, Olson & Bear, LLP

(57) ABSTRACT

An apparatus configured to code video information includes a memory unit and a processor in communication with the memory unit. The memory unit is configured to store video information associated with a first video layer having a current picture. The processor is configured to process a first offset associated with the current picture, the first offset indicating a difference between (a) most significant bits (MSBs) of a first picture order count (POC) of a previous picture in the first video layer that precedes the current picture in decoding order and (b) MSBs of a second POC of the current picture.

18 Claims, 9 Drawing Sheets

(56) References Cited

OTHER PUBLICATIONS

Choi B., et al., "MV-HEVC/SHVC HLS: Alignment of picture order counts," 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); Retrieved from the Internet; URL: http://phenix.int-evry.fr/JCT2/, No. JCT3V-F0053, Oct. 15, 2013 (Oct. 15, 2013), 5 pages, XP030131458.

Deshpande S., et al., "AHG21: Comments on Signaling of Reference Pictures", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16 ); URL:http://wftp3.itu.int/av-arch/jctvc-site/, No. JCTVC-H0531, Jan. 27, 2012 (Jan. 27, 2012), XP030111558; 5 pages.

Hannuksela (Nokia) M M: "MV-HEVC/SHVC HLS: on POC value derivation", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0092, Oct. 15, 2013 (Oct. 15, 2013), XP030131503; 2 pages.

International Search Report and Written Opinion—PCT/US2014/071505—ISA/EPO—dated Mar. 6, 2015

Lee H., et al., "MV-HEVC/SHVC HLS: on POC reset for long-term reference pictures", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0047, p. 1-6, Oct. 14, 2013 (Oct. 14, 2013), XP030131447.

Ramasubramonian A.K., et al., "MV-HEVC/SHVC HLS: on picture order count", 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0073, Oct. 15, 2013 (Oct. 15, 2013), XP030131481; 10 pages.

\* cited by examiner

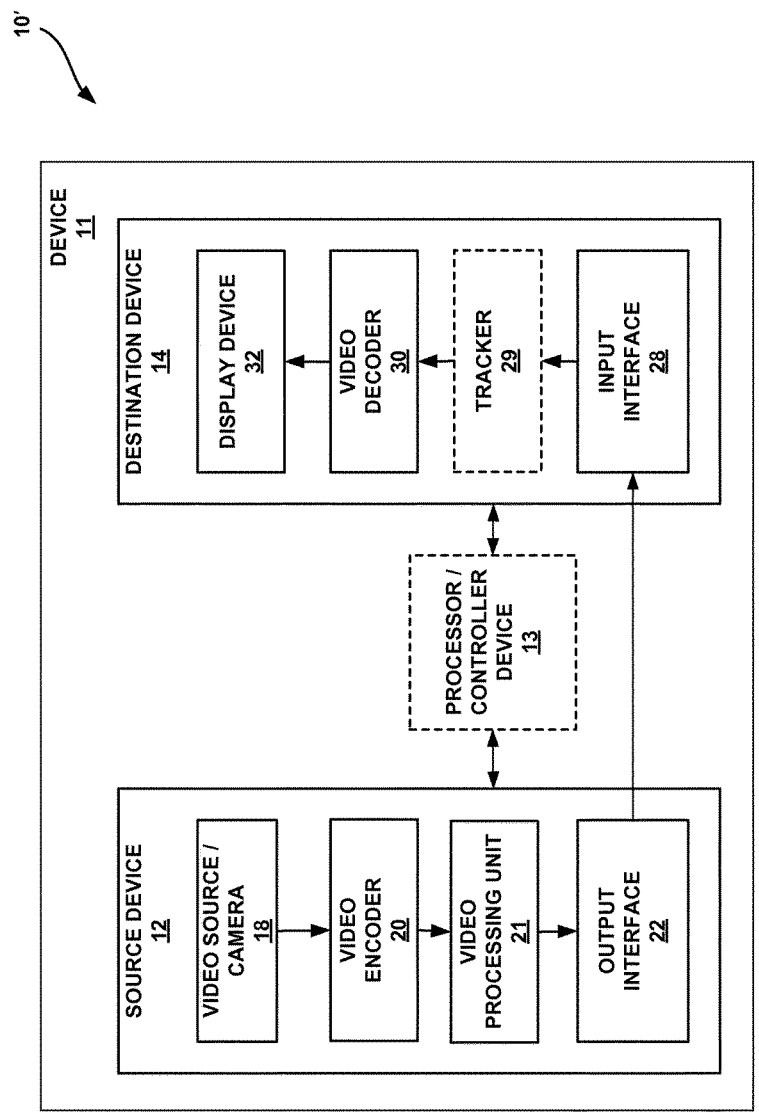

| | AU | | 630 | 640 | 650 | 660 |
|---|---|---|---|---|---|---|
| W/O RESET | LSB | EL | 112 | 113 | 114 | 115 |
| | | BL | 112 | 0 | 1 | 2 |
| | MSB | EL | 1 | 1 | 1 | 1 |
| | | BL | 1 | 0 | 0 | 0 |
| W/ RESET | LSB | EL | 112 | 0 | 1 | 2 |
| | | BL | 112 | 0 | 1 | 2 |
| | MSB | EL | 1 | 0 | 0 | 0 |
| | | BL | 1 | 0 | 0 | 0 |

DEVICE AND METHOD FOR SCALABLE CODING OF VIDEO INFORMATION

CROSS-REFERENCE TO RELATED APPLICATIONS

This application claims priority to U.S. Provisional No. 61/918,630, filed Dec. 19, 2013.

TECHNICAL FIELD

This disclosure relates to the field of video coding and compression, particularly to scalable video coding (SVC), multiview video coding (MVC), or three-dimensional (3D) video coding (3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

The systems, methods and devices of this disclosure each have several innovative aspects, no single one of which is solely responsible for the desirable attributes disclosed herein.

In one aspect, an apparatus configured to code (e.g., encode or decode) video information includes a memory unit and a processor in communication with the memory unit. The memory unit is configured to store video information associated with a first video layer having a current picture. The processor is configured to process a first offset associated with the current picture, the first offset indicating a difference between (a) most significant bits (MSBs) of a first picture order count (POC) of a previous picture in the first video layer that precedes the current picture in decoding order and (b) MSBs of a second POC of the current picture.

In another aspect, a method of coding video information comprises process a first offset associated with a current picture in a first video layer, the first offset indicating a difference between (a) most significant bits (MSBs) of a first POC of a previous picture in the first video layer that precedes the current picture in decoding order and (b) MSBs of a second POC of the current picture.

In another aspect, a non-transitory computer readable medium comprises code that, when executed, causes an apparatus to perform a process. The process includes storing video information associated with a first video layer having a current picture, and processing a first offset associated with the current picture, the first offset indicating a difference between (a) most significant bits (MSBs) of a first POC of a previous picture in the first video layer that precedes the current picture in decoding order and (b) MSBs of a second POC of the current picture.

In another aspect, a video coding device configured to code video information comprises means for storing video information associated with a first video layer having a current picture, and means for processing a first offset associated with the current picture, the first offset indicating a difference between (a) most significant bits (MSBs) of a first POC of a previous picture in the first video layer that precedes the current picture in decoding order and (b) MSBs of a second POC of the current picture.

BRIEF DESCRIPTION OF DRAWINGS

FIG. 1B is a block diagram illustrating another example video encoding and decoding system that may perform techniques in accordance with aspects described in this disclosure.

DETAILED DESCRIPTION

Figure 1A:
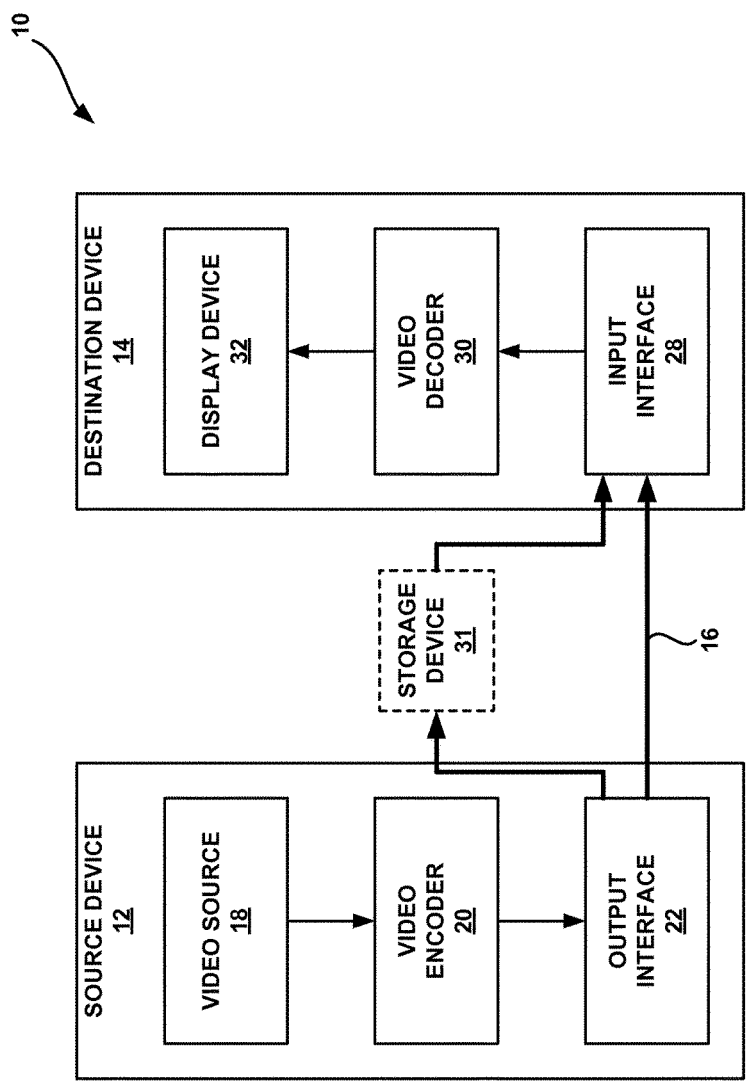
FIG. 1A is a block diagram illustrating an example video encoding and decoding system that may utilize techniques in accordance with aspects described in this disclosure.

In general, this disclosure relates to POC management for multi-layer video coding in the context of advanced video codecs, such as HEVC (High Efficiency Video Coding). More specifically, the present disclosure relates to systems and methods for improved performance of inter-layer prediction in scalable video coding (SVC) extension of HEVC.

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In some video coding schemes, a picture order count (POC) may be used to indicate the order in which the pictures are to be output or displayed. Further, in some implementations, the value of the POC may be reset (e.g., set to zero, set to a value signaled in the bitstream, or derived from information included in the bitstream) whenever certain types of pictures are processed in the bitstream. For example, when certain random access point pictures are processed in the bitstream, the POC may be reset.

In order to improve bit rate efficiency, in some implementations, only a portion of the POC is signaled. For example, the least significant bits (LSBs) of the POC may be signaled and the most significant bits (MSBs) of the POC may be calculated (e.g., determined) using the network abstraction layer (NAL) unit type of the picture and the LSBs and/or MSBs of pictures that precede the current picture in decoding order. In other implementations, POC MSB information may be signaled in the slice header extension of certain types of pictures, including clean random access (CRA) pictures and broken link access (BLA) pictures, to improve error resilience of the POC derivation process. However, the use of the signaled POC MSB information to calculate the POC values only for CRA and BLA pictures (with NoRaslOutputFlag equal to a value of 1) may result in incorrect POC values or result in POC values that are not aligned across multiple layers in some cases. Alignment across multiple layers (e.g., cross-alignment), for example, occurs when each picture of an access unit has the same POC value, such that the pictures of the access unit are output simultaneously or nearly simultaneously. Such non-alignment would violate the constraint required by the Scalable High Efficiency Video Coding (SHVC) standard that mandates that the pictures in a single access unit have identical POC values.

Thus, an improved coding method for deriving the POC values is desired.

In the present disclosure, various techniques that maybe used to improve POC derivation for multi-layer video coding are described. In some embodiments of the present disclosure, the POC MSB information (sometimes referred to as a "POC MSB cycle" in the present disclosure) may be provided not just with CRA and BLA pictures but also with instantaneous decoder refresh (IDR) pictures. By providing the POC MSB information in connection with IDR pictures, error resilience and improved POC derivation may be achieved for IDR pictures as well. In some embodiments of the present disclosure, the POC MSB information may be utilized in different ways based on whether the POC MSB information is provided with a POC-reset picture or not. For example, if the POC MSB information is provided with a POC-reset picture, the POC MSB information may be used to update the POC values of pictures in the decoded picture buffer (DPB). If the POC MSB information is provided with a non-POC-reset picture, the POC MSB information is used to calculated (e.g., determine) the POC of the non-POC-reset picture. By considering whether the picture is a POC-reset picture, a coder may be able to prevent the pictures in the DPB from becoming out of order after a POC reset.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

As shown in FIG. 1A, video coding system 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination modules 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination modules 12, 14 are on or part of a device 11. The device 11 may be a telephone handset, such as a "smart" phone or the like. The device 11 may include an optional controller/processor device 13 in operative communication with the source and destination modules 12, 14. The system 10' of FIG. 1B may further include a video processing unit 21 between video encoder 20 and the output interface 22. In some implementations, the video processing unit 21 is a separate unit, as illustrated in FIG. 1B; however, in other implementations, the video processing unit 21 can be implemented as a portion of video encoder 20 and/or the processor/controller device 13. The system 10' may also include an optional tracker 29, which can track an object of interest in a video sequence. The object or interest to be tracked may be segmented by a technique described in connection with one or more aspects of the present disclosure. In related aspects, the tracking may be performed by the display device 32, alone or in conjunction with the tracker 29. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
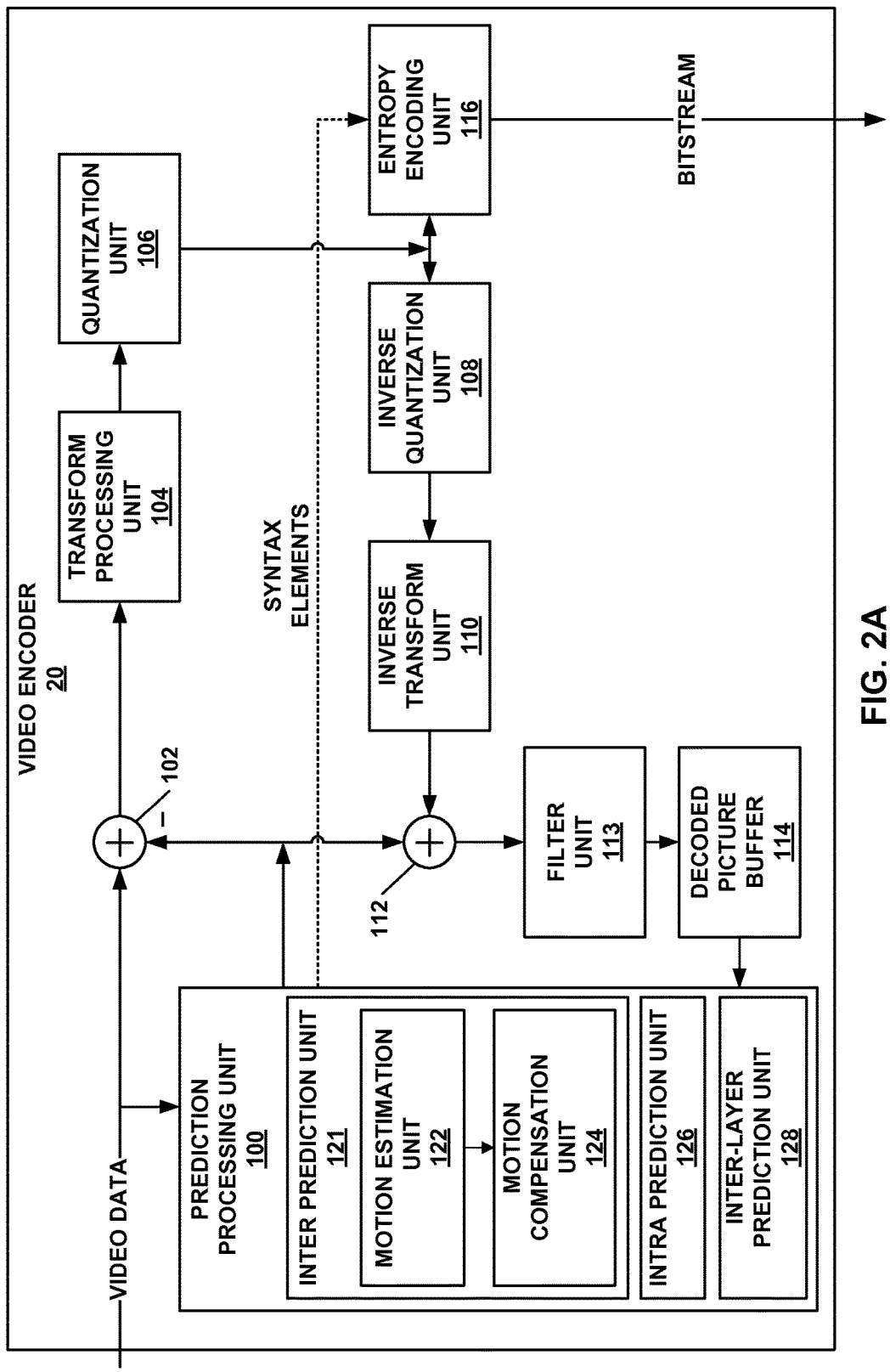
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIG. 8, the prediction processing unit 100 may be configured to code (e.g., encode or decode) the PU (or any other reference layer and/or enhancement layer blocks or video units) by performing the methods illustrated in FIG. 8. For example, inter prediction unit 121 (e.g., via motion estimation unit 122 and/or motion compensation unit 124), intra prediction unit 126, or inter-layer prediction unit 128 may be configured to perform the methods illustrated in FIG. 8, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
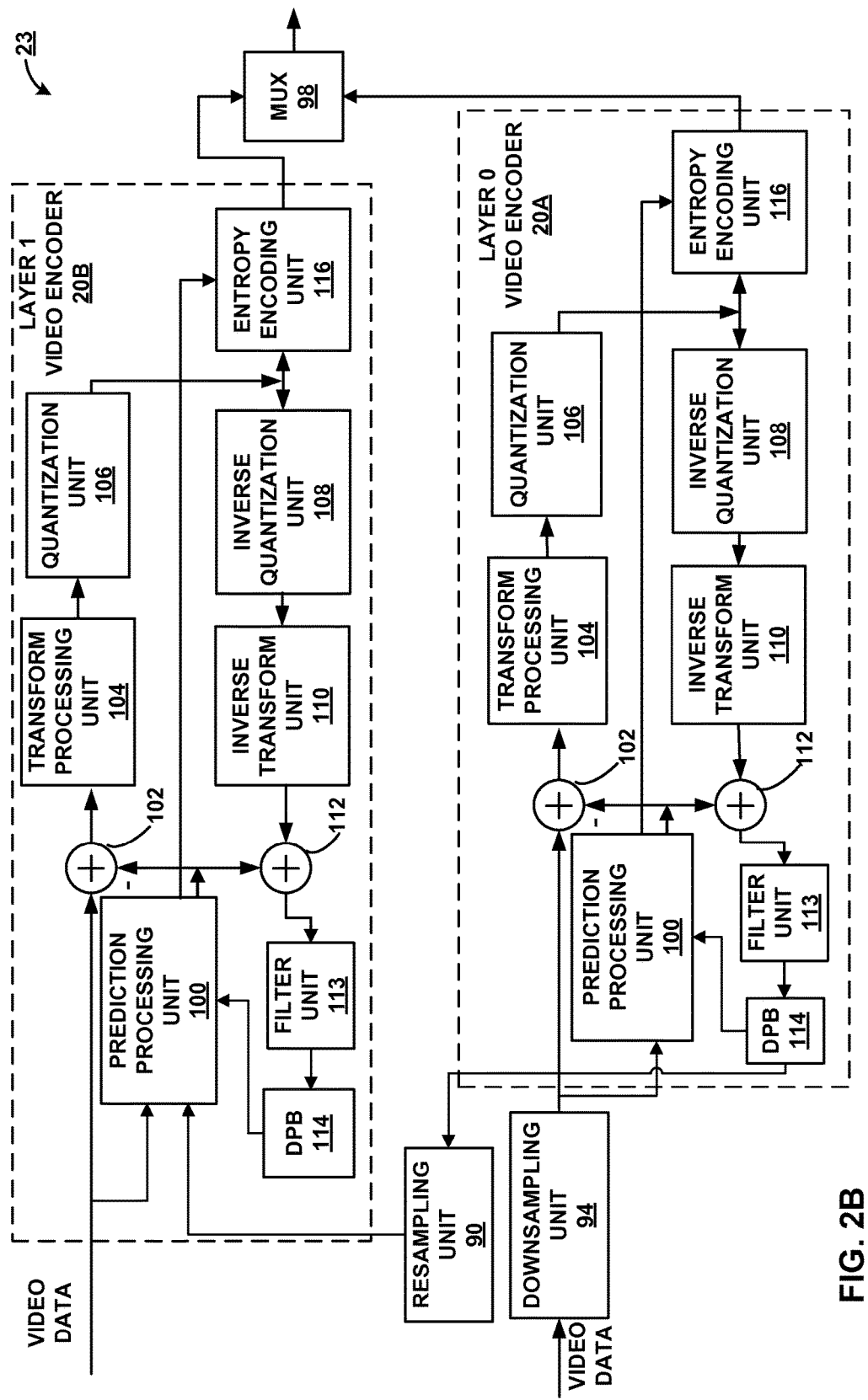
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include an resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
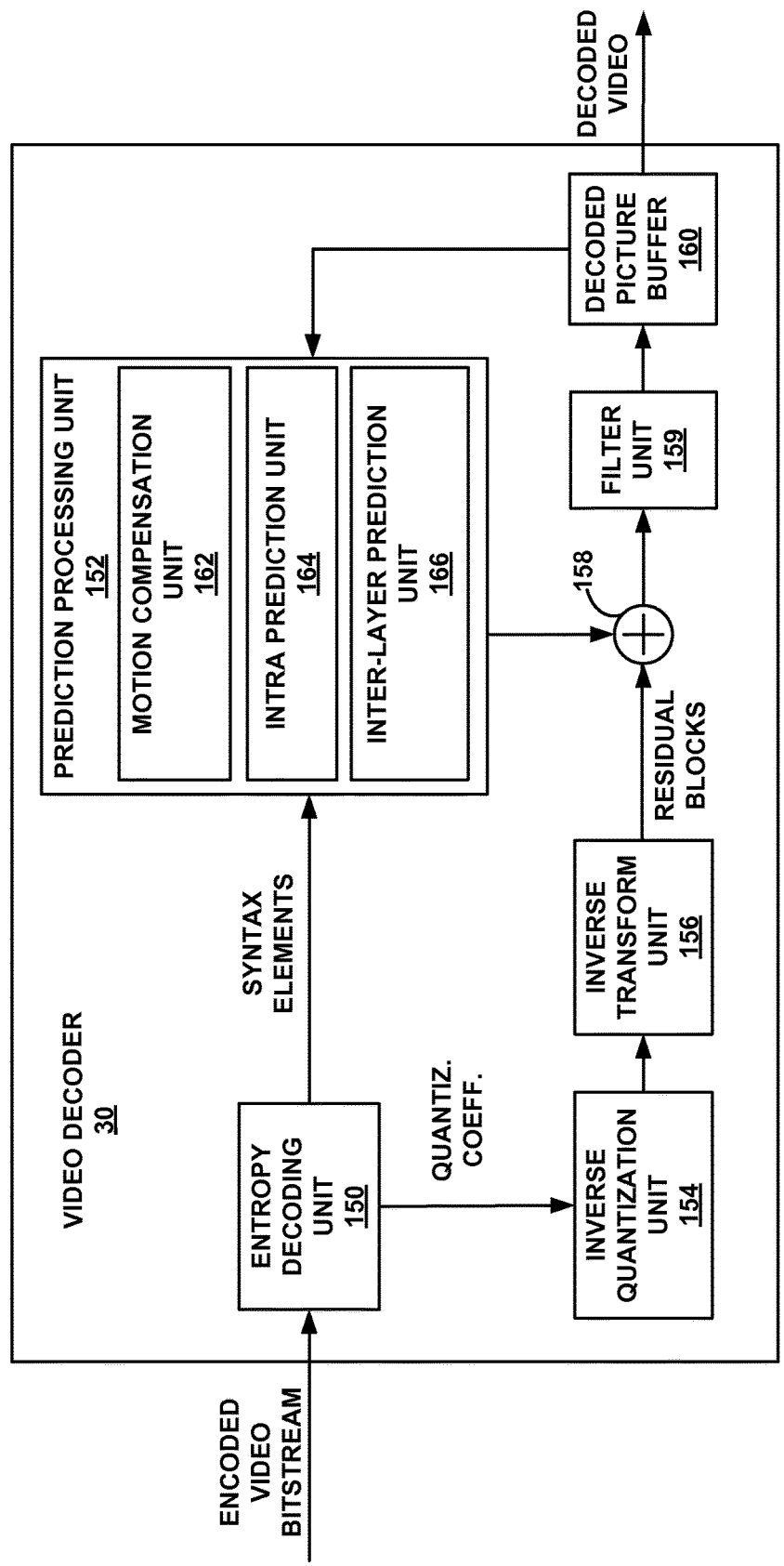
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIG. 8, the prediction processing unit 152 may code (e.g., encode or decode) the PU (or any other reference layer and/or enhancement layer blocks or video units) by performing the methods illustrated in FIG. 8. For example, motion compensation unit 162, intra prediction unit 164, or inter-layer prediction unit 166 may be configured to perform the methods illustrated in FIG. 8, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
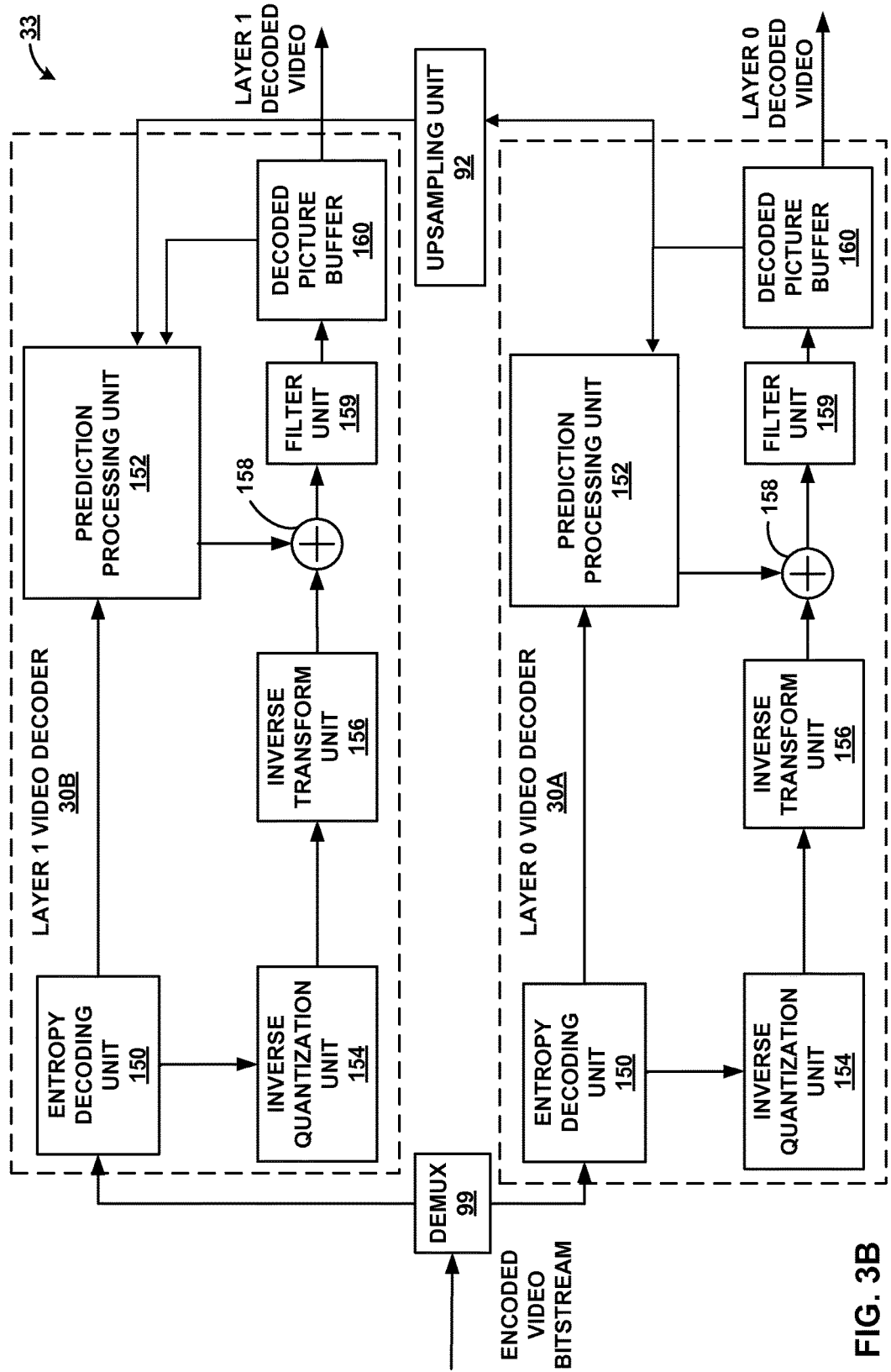
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Intra Random Access Point (IRAP) Pictures

Some video coding schemes may provide random access points throughout the bitstream such that the bitstream may be decoded starting from any of such random access point without needing to decode any pictures that precede such random access points. In such video coding schemes, all pictures that follow a random access point in output order (e.g., including those pictures that are in the same access unit as the picture providing the random access point) can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (TRAP) pictures. For example, a random access point (e.g., provided by an enhancement layer TRAP picture) in an enhancement layer ("layerA") contained in an access unit ("auA") may provide layer-specific random access such that for each reference layer ("layerB") of layerA (e.g., a reference layer being a layer that is used to predict layerA) having a random access point contained in an access unit ("auB") that is in layerB and precedes auA in decoding order (or a random access point contained in auA), the pictures in layerA that follow auB in output order (including those pictures located in auB), are correctly decodable without needing to decode any pictures in layerA that precede auB.

IRAP pictures may be coded using intra prediction (e.g., coded without referring to other pictures), and may include, for example, IDR pictures, CRA pictures, and BLA pictures. When there is an IDR picture in the bitstream, all the pictures that precede the IDR picture in decoding order are not used for prediction by pictures that follow the IDR picture in decoding order. When there is a CRA picture in the bitstream, the pictures that follow the CRA picture may or may not use pictures that precede the CRA picture in decoding order for prediction. Pictures that follow the CRA picture in decoding order but use pictures that precede the CRA picture in decoding order may be referred to as random access skipped leading (RASL) pictures. Another type of picture that follows an TRAP picture in decoding order and precedes the TRAP picture in output order is a random access decodable leading (RADL) picture, which may not contain references to any pictures that precede the TRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., a picture having a layer ID value of 0) that is an TRAP picture may be referred to as an TRAP access unit.

Cross-Layer Alignment of IRAP Pictures

In SVC, TRAP pictures may not be required to be aligned (e.g., contained in the same access unit) across different layers. For example, if IRAP pictures were required to be aligned, any access unit containing at least one IRAP picture would only contain IRAP pictures. On the other hand, if IRAP pictures were not required to be aligned, in a single access unit, one picture (e.g., in a first layer) may be an IRAP picture, and another picture (e.g., in a second layer) may be a non-IRAP picture. Having such non-aligned IRAP pictures in a bitstream may provide some advantages. For example, in a two-layer bitstream, if there are more IRAP pictures in the base layer than in the enhancement layer, in broadcast and multicast applications, low tune-in delay and high coding efficiency can be achieved.

In some video coding schemes, a picture order count (POC) may be used to keep track of the relative order in which the decoded pictures are displayed. Some of such coding schemes may cause the POC values to be reset (e.g., set to zero or set to some value signaled in the bitstream) whenever certain types of pictures are processed in the bitstream. For example, the POC values of certain IRAP pictures may be reset, causing the POC values of other pictures preceding those IRAP pictures in decoding order to also be reset. This may be problematic when the IRAP pictures are not required to be aligned across different layers. For example, when one picture ("picA") is an IRAP picture and another picture ("picB") in the same access unit is not an IRAP picture, the POC value of a picture ("picC"), which is reset due to picA being an IRAP picture, in the layer containing picA may be different from the POC value of a picture ("picD"), which is not reset, in the layer containing picB, where picC and picD are in the same access unit. This causes picC and picD to have different POC values even though they belong to the same access unit (e.g., same output time). Thus, in this example, the derivation process for deriving the POC values of picC and picD can be modified to produce POC values that are consistent with the definition of POC values and access units.

Picture Order Count (POC)

As discussed above, the value of a picture order count (POC) (e.g., PicOrderCntVal in HEVC) for a particular coded picture denotes the relative order of the particular coded picture in the picture output process with respect to other pictures in the same coded video sequence. In some embodiments, the POC comprises least significant bits (LSB) and most significant bits (MSB), and the POC may be obtained by concatenating the MSB and the LSB. In other embodiments, the POC may be obtained by adding the MSB value and the LSB value. The LSB may be signaled in the slice header, and the MSB may be computed by the encoder or the decoder based on the NAL unit type of the current picture and the MSB and LSB of one or more previous pictures in decoding order that are (1) not RASL or RADL pictures, (2) not discardable (e.g., pictures marked as "discardable," indicating that no other picture depends on them, thereby allowing them to be dropped to satisfy bandwidth constraints), (3) not sub-layer non-reference pictures (e.g., pictures that are not used for reference by other pictures in the same temporal sub-layer or the same layer), (4) has a temporal ID (e.g., temporal sub-layer ID) equal to a value of 0. Such pictures described in (1)-(4) may be referred to herein as POC-anchor pictures. Similarly, pictures having a temporal ID value greater than a value of 0, RASL or RADL pictures, discardable pictures, or sub-layer non-reference pictures may be referred to as non-POC-anchor pictures. POC-anchor pictures may further include pictures that an encoder and/or a decoder may not elect to remove from the bitstream (e.g., to satisfy a bandwidth constraint). POC-anchor pictures may further include any picture other than the types of pictures that an encoder and/or a decoder may be configured to remove from the bitstream (e.g., to satisfy a bandwidth constraint). Non-POC-anchor pictures may include any picture that is not a POC-anchor picture.

When the current picture is (1) an TRAP picture with NoRaslOutputFlag (e.g., a flag that indicates that RASL pictures are not to be output if set to a value of 1 and indicates that RASL pictures are to be output if set to a value of 0) equal to a value of 1, or (2) a CRA picture that is the first picture of the bitstream, the value of POC MSB is inferred to be equal to a value of 0. As described above, in a multi-layer bitstream (e.g., SHVC or MV-HEVC bitstream with more than one layer), there may exist access units (AU) where one or more pictures are IRAP pictures and one or more other pictures are non-IRAP pictures, and such AUs may be referred to as "non-aligned IRAP AUs." When decoding bitstreams containing non-aligned IRAP AUs, it is possible (and likely) that the POCs derived based on the POC LSB values signaled in the bitstream would violate the bitstream conformance requirement that all pictures in an access unit should have the same POC value.

In some embodiments, a POC reset flag (e.g., poc_reset_flag) may be used to reset the POC of the pictures such that even when non-aligned IRAP AUs are present in the bitstream, the POC value of the current picture and the pictures in the DPB are adjusted such that the POC of all the pictures in an AU are the same.

In some embodiments, instead of a single POC reset flag, two flags may be used: a POC MSB reset flag (e.g., poc_msb_reset_flag) and a POC LSB reset flag (e.g., poc_lsb_reset_flag). The former (i.e., the poc_msb_reset_flag) resets the MSB of the POC, and the latter (i.e., the poc_lsb_reset_flag) resets the LSB of the POC. Both of these flags may be signaled in the slice header.

For example, if a particular picture has a POC value of 233, and the MSB and the LSB of the POC constitute 1 bit and 7 bits, respectively, the MSB would be "1" (e.g., having a value of 128) and the LSB would be "1101001" (e.g., having a value of 105). Thus, if only the MSB of the POC is reset (e.g., in response to processing poc_msb_reset_flag having a value of 1), the POC value becomes 105, and if only the LSB are reset (e.g., in response to processing poc_lsb_reset_flag having a value of 1), the POC value becomes 128. If both the MSB and the LSB are reset (e.g., in response to processing poc_msb_reset_flag and poc_lsb_reset_flag, each having a value of 1), the POC value becomes 0.

In some embodiments, the two flags (e.g., poc_msb_reset_flag and poc_lsb_reset_flag) may be replaced with a two-bit POC reset indicator. For example, the two-bit POC reset indicator may have 4 possible values (e.g., 0-3), where 0 indicates no reset, 1 indicates an MSB reset, 2 indicates, an MSB and LSB reset, and 3 is used for error resilience (e.g., indicate something about another POC reset such as a POC reset ID, POC resetting period ID, etc.).

Resetting of POC Values

With reference to FIGS. 4-7, the motivation for resetting the POC values (e.g., the LSB and the MSB) in non-aligned IRAP AUs will be described. As described above, in some coding schemes, certain conformance constraints may specify that the POC of all coded pictures in a single AU should be the same. Without appropriate resets of the POC values, non-aligned IRAP AUs in the bitstream may produce POC values that violate such conformance constraints.

Figures 4, 5:
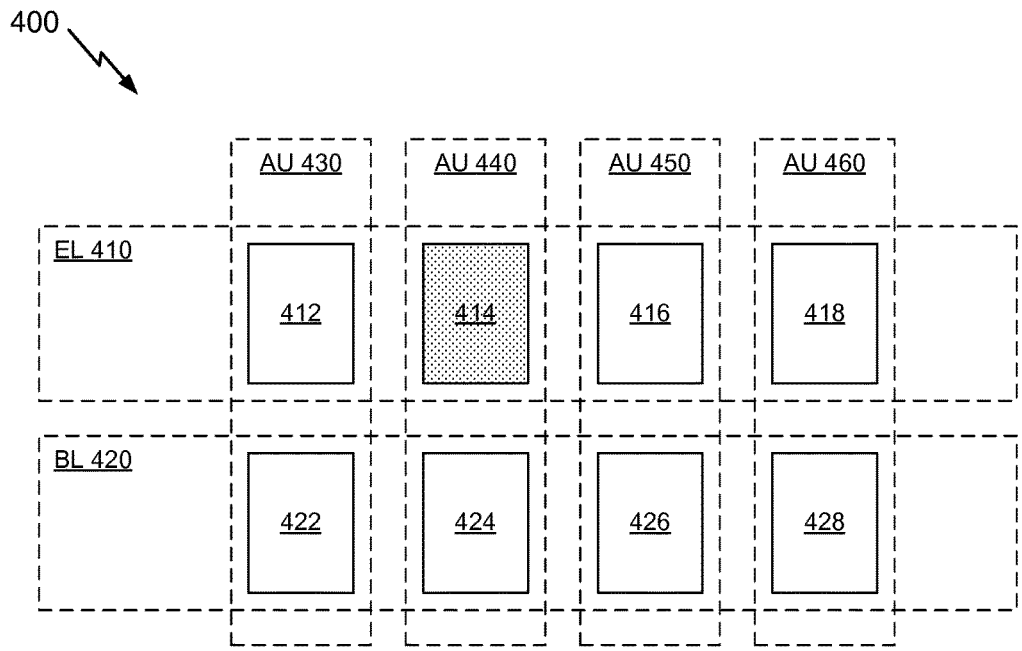
FIG. 4 is a block diagram illustrating an example configuration of pictures in different layers.
FIG. 5 is a table illustrating POC values of pictures in different layers.

FIG. 4 shows a multi-layer bitstream 400 including an enhancement layer (EL) 410 and a base layer (BL) 420. The EL 410 includes EL pictures 412-418, and the BL includes BL pictures 422-428. The multi-layer bitstream 400 further includes access units (AUs) 430-460. The AU 430 includes the EL picture 412 and the BL picture 422, the AU 440 includes the EL picture 414 and the BL picture 424, the AU 450 includes the EL picture 416 and the BL picture 426, and the AU 460 includes the EL picture 418 and the BL picture 428. In the example of FIG. 4, the EL picture 414 is an IDR picture, and the corresponding BL picture 424 in the AU 440 is a trailing picture (e.g., a non-TRAP picture), and consequently, the AU 440 is a non-aligned TRAP AU. In some embodiments, an MSB reset is performed at a given picture if the picture is an IDR picture that is not in the base layer. Such an IDR picture may have a non-zero POC LSB value.

FIG. 5 shows a table 500 that illustrates the POC values that may be signaled or derived in connection with the multi-layer bitstream 400 of FIG. 4. As shown in FIG. 5, the MSB of the POC in the EL 410 is reset at the EL picture 414, while the MSB of the POC in the BL 420 is not reset. Thus, if a reset is not performed in the BL 420 at the BL picture 424 in the non-aligned IRAP AU 440, the POC values of BL pictures and the EL pictures in the AUs 440-460 would not match (i.e., be equivalent) as specified by the conformance constraints. The differences in the POC values with and without a reset are highlighted in bold in FIG. 5.

Figure 6:
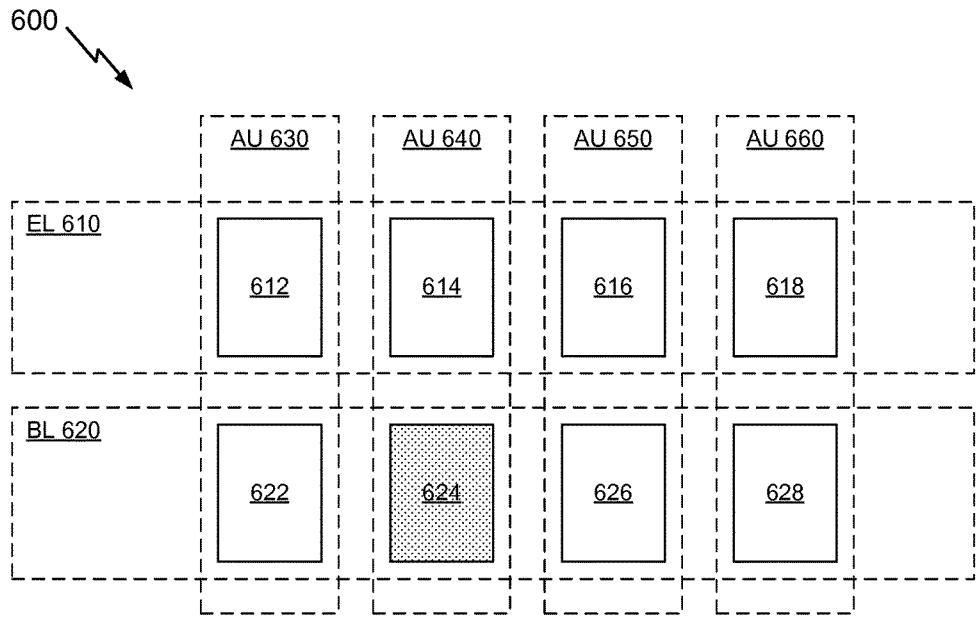
FIG. 6 is a block diagram illustrating an example configuration of pictures in different layers.

FIG. 6 shows a multi-layer bitstream 600 including an enhancement layer (EL) 610 and a base layer (BL) 620. The EL 610 includes EL pictures 612-618, and the BL includes BL pictures 622-628. The multi-layer bitstream 600 further includes access units (AUs) 630-660. The AU 630 includes the EL picture 612 and the BL picture 622, the AU 640 includes the EL picture 614 and the BL picture 624, the AU 650 includes the EL picture 616 and the BL picture 626, and the AU 660 includes the EL picture 618 and the BL picture 628. In the example of FIG. 6, the BL picture 624 is an IDR picture, and the corresponding EL picture 614 in the AU 640 is a trailing picture (e.g., a non-IRAP picture), and consequently, the AU 640 is a non-aligned IRAP AU. In some embodiments, an MSB reset and an LSB reset are performed for a given picture if the picture is an IDR picture that is in the base layer. For example, the bitstream may include an indication that the POC MSB and the POC LSB of such a BL IDR picture should be reset. Alternatively, the decoder may perform the reset of the POC MSB and the POC LSB of such a BL IDR picture without any indication in the bitstream that a POC reset should be performed.

Figure 7:
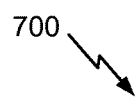
FIG. 7 is a table illustrating POC values of pictures in different layers.

FIG. 7 shows a table 700 that illustrates the POC values that may be signaled or derived in connection with the multi-layer bitstream 600 of FIG. 6. As shown in FIG. 7, the MSB and the LSB of the POC in the BL 620 is reset at the BL picture 624, while neither the MSB nor the LSB of the POC in the EL 610 is reset. Thus, if a reset of the MSB and the LSB of the POC is not performed in the EL 610 at the EL picture 614 in the non-aligned IRAP AU 640, the POC values of BL pictures and the EL pictures in the AUs 640-660 would not match as specified by the conformance constraints. The differences in the POC values with and without a reset are highlighted in bold in FIG. 7.

The embodiments described herein are not limited to the example bitstream configurations illustrated in FIGS. 4 and 6, and the techniques described herein may be extended to any multi-layer bitstream having any number of layers, access units, and pictures. Also, in the examples illustrated in FIGS. 4-7, the LSB of the POC is represented using seven bits. However, the techniques described herein may be extended to scenarios having any forms of POC value representation.

Reset of Preceding Pictures and Loss of Reset Pictures

When an MSB reset or an LSB reset is performed at a particular picture, other pictures in the same layer that precede the particular picture in decoding order are also reset based on the reset performed at the particular picture. For example, in the example of FIG. 6, the EL picture 614 has a POC value of 241 (e.g., LSB of "1110001"+MSB of "1", which is 113+128). When the MSB and LSB resets are performed at the EL picture 614, the POC value of the EL picture 614 becomes 0, and the EL picture 612 in the EL 610 which precedes the EL picture 614 in decoding order is also reset based on the original POC value of 241 of the EL picture 614. For example, the new POC value of the EL picture 612 is calculated by subtracting the pre-reset POC value of the EL picture 614 (which is a value of 241) from the pre-reset POC value of the EL picture 612, which is 240 (e.g., LSB of "1110000"+MSB of "1", which is 112+128). Thus, after the reset, the POC value of the EL picture 612 becomes −1, in accordance with the fact that the EL picture 612 is to be output before the EL picture 614, where a smaller POC value denotes an earlier position in output order. As shown in FIG. 7, the signaled LSB values for the subsequent AUs 650 and 660 are adjusted accordingly (e.g., to a value of 1 and a value of 2, respectively), with the assumption that the reset is performed at the EL picture 614.

However, even if an appropriate POC reset of the MSB and/or the LSB described above is signaled in the bitstream (e.g., in the slice header) so that the decoder can process the signal and perform the POC reset accordingly, if the picture signaling such a POC reset is lost during transmission of the bitstream or removed from the bitstream in order to satisfy bandwidth constraints, the POC reset intended to be performed at the particular picture may not be properly performed.

For example, in the example of FIG. 6, if the EL picture 614 is unavailable to the decoder, the decoder would not know (i.e., would not determine) to reset the MSB and LSB of the POC in the EL 610 at the AU 640. Consequently, the POC values of any pictures preceding the unavailable EL picture 614 in decoding order would still have their original, pre-reset POC values since the reset at the EL picture 614 did not take place (e.g., the reset operation was not performed). On the other hand, the POC values of the pictures following the unavailable EL picture 614 in decoding order would have been determined or signaled as if reset actually took place (i.e., the reset operation was performed). Thus, in the example of FIG. 7, the EL pictures 612, 616, and 618 would have POC values of 240, 1, and 2, respectively, which would be incorrect given that the EL picture 612 precedes the EL pictures 616 and 618 in output order. Thus, a coding method that results in correct POC values, even when the picture signaling the POC reset becomes unavailable, is desired.

POC Resetting Period ID

In some embodiments, a POC resetting period ID is used to identify each POC resetting period (e.g., a period that begins with a POC reset and ends immediately prior to the next POC reset). A bitstream conformance constraint may mandate that the POC resetting period IDs for two temporally consecutive (e.g., in decoding order) POC resetting periods be different. Each picture in a POC resetting period may be associated with the POC resetting period ID of the POC resetting period. Using the POC resetting period IDs, the coder may be able to ensure that the POC values are aligned across multiple layers even if one or more pictures in the POC-resetting AU are lost.

Using POC Values as Anchor Information

In some embodiments, POC values assigned to a decoded picture may be utilized as anchor information. For example, the POC value assigned to a particular picture may be used to calculate at least a portion of the POC value (e.g., MSB, LSB, or both) of another picture that follows the particular picture in decoding order. In such a case, the portion of the POC value calculated using previously signaled information need not be explicitly signaled, thereby resulting in bit savings.

However, the POC value that is assigned to a decoded picture may not be static and may be updated when a POC reset process is invoked. This mutable nature of POC values may render the POC values less useful for use as anchor information for other processors or other pictures in the bitstream. Thus, if a bitstream invokes processes, such as a POC reset, that may alter the POC values associated with the decoded pictures, an improved coding scheme that accounts for such processes when making use of the POC values is desired.

Outputting Pictures in the DPB on POC Reset

In some implementations, a bitstream constraint may mandate that for any POC resetting period, all the pictures that precede the POC resetting period should be output before the POC reset picture (e.g., a picture having an indication to reset the POC associated therewith) associated with the POC resetting period or any picture that follow the POC reset picture in decoding order. In order to satisfy such a bitstream constraint, when a POC reset is invoked (e.g., indicated by a POC reset indicator associated with the POC reset picture), the coder may output all pictures in the DPB that were decoded before the POC reset picture.

However, outputting all earlier pictures in the DPB whenever a POC reset is invoked (e.g., whenever the coder processes a POC-resetting picture) would result in an incorrect output order of pictures in output-order conformant decoders as there is no guarantee that the pictures that follow the POC-resetting picture in decoding order necessarily follow, in output order, all the pictures that precede the POC resetting picture in decoding order. For example, a picture that follows the POC-resetting picture in decoding order might precede one of the pictures that are decoded before the POC-resetting picture in output order.

For example, if Picture A is a POC reset picture, Picture B is a picture that precedes Picture A in decoding order, and Picture C is a picture that follows Picture A in decoding order, the proper decoding order would be Picture B, Picture A, and Picture C. If Picture C is to be output before Picture A, which is to be output before Picture B, the proper output order would be Picture C, Picture A, and Picture B. If all pictures in the DPB are to be output according to the embodiment above, the coder would decode and store Picture B in the DPB, decode Picture A and output Picture B in the DPB upon realizing that Picture A is a POC reset picture. However, outputting Picture B before Picture C would be incorrect according to the proper output order described above.

POC Reset and SEI Messages

In some existing coding schemes, the semantics of several SEI messages would not be compatible with the POC reset process proposed for multi-layer video coding and lead to ambiguity in application of the SEI message to the bitstream. For example, in version 1 of the HEVC specification, many of the SEI messages were defined in such a way that they were dependent on POC. When the implementation is extended to multi-layer cases, the concept of resetting the POC was introduced. As a result, the existing SEI messages were rendered incorrect or ambiguous in many cases, especially in how the SEI messages were defining the POC. Thus, an improved coding scheme that includes updated semantics for the SEI messages that are compatible with the concept of POC resets is desired.

POC Information in Feedback Messages

In some implementations, the use of the POC information for identifying a picture in feedback messages is unclear. For examples, many systems use feedback messages that identify pictures. For example, in a session between a source and a receiver, if some pictures are lost, the POCs of the pictures are used to identify the pictures that are lost. This POC information may be transmitted in feedback messages. With the possibility of POC resets, the POC information included in the feedback messages may need to include, in addition to the POC of the picture being identified, information regarding the POC resetting period to which the picture belongs. For example, multiple pictures may have the same POC, and the system may not be able to correctly identify those pictures unless the system is given the information regarding the POC resetting periods to which the pictures belong. Thus, an improved system that indicates the POC resetting period of the picture being identified in a feedback message is desired.

Signaling POC MSB Cycle

In some implementations, POC LSB is signaled and POC MSB is calculated using the NAL unit type of the current picture and the LSB and/or MSB of pictures that precede the current picture in decoding order. In other implementations, POC MSB information is signaled in the slice header extension of CRA and BLA pictures to improve error resilience of derivation of POC. However, the use of the signaled POC MSB for calculating the POC values only for CRA and BLA pictures (with NoRaslOutputFlag equal to a value of 1) would result in POC values that are not aligned across multiple layers in some cases. Thus, an improved coding scheme that improves cross-layer alignment of POC values is desired.

EXAMPLES AND IMPLEMENTATIONS

Several methods that may be used to address certain problems described above will be described below. Some of these methods may be applied independently, and some of them may be applied in combination. In addition, the example syntax and semantics that may be used to implement one or more of the methods described herein are also provided below. When certain portions of the HEVC specification are reproduced to illustrate the additions and deletions that may be incorporated to implement one or more of the methods described herein, such modifications are shown in italics.

Signaling Values for POC Derivation

In some embodiments of the present disclosure, an SEI message that contains information for correct POC derivation is signaled for one or more pictures that follow the picture for which the POC MSB and/or the POC LSB is to be reset. For example, the SEI message may be associated with a picture, picA, that follows another picture, picB, for which the POC MSB, the POC LSB, or both are to be reset. Thus, even when picB is entirely lost, the SEI message associated with picA can be used to derive the correct POC values for other pictures in the same layer.

In some embodiments of the present disclosure, the information for correct POC derivation is signaled in the slice header of one or more pictures that follow the picture for which the POC MSB and/or the POC LSB is to be reset. For example, the information may be included in the slice header of a picture picA that follows another picture picB for which the POC MSB, the POC LSB, or both are to be reset. Thus, even when picB is entirely lost, the information included in the slice header of picA can be used to derive the correct POC values for other pictures in the same layer.

In some embodiments of the present disclosure, the information (which may be referred to herein as POC derivation information) signaled in the slice header of the picture and/or signaled as an SEI message associated with the picture may include: a POC reset type indicating whether the POC value of the preceding POC-reset picture (e.g., a picture at which a POC reset is to be performed) in the same layer is to be reset by resetting both most significant bits (MSB) and least significant bits (LSB) of the POC value or by resetting only the MSB of the POC value; a POC reset value indicating the POC value of the picture that was lost or removed that also precedes the picture with which the POC derivation information is associated; and a POC reset ID identifying the POC reset for which the POC derivation information is provided. For example, the decoder may skip a POC reset signaled in connection with a particular picture if the signaled POC reset has a POC reset ID value of 1 and another POC reset having a POC reset ID of 1 has already been performed.

Output Order Constraint Regarding POC-Resetting Picture

In some embodiments of the present disclosure, a bitstream constraint is added so that a picture that follows, in decoding order, a POC-resetting picture shall not precede, in output order, another picture that precedes, in decoding order, the POC-resetting picture. In such embodiments, the coder may determine such a bitstream constraint to be applicable and adhere to the bitstream constraint such that the coded bitstream conforms to the bitstream constraint.

For example, before a POC reset is signaled in connection with a current picture, the coder may determine whether any picture that follows the current picture in decoding order is to be output before any other picture that precedes the current picture in decoding order. If the coder determines that any picture that follows the current picture in decoding order is to be output before any other picture that precedes the current picture in decoding order, the coder may refrain from signaling the POC reset in association with the current picture, to ensure that the coded bitstream conforms to the bitstream constraint.

Alternatively, the coder may, after determining that a POC reset is to be signaled in connection with a current picture, ensure that no picture that follows the current picture in decoding order is to be output before any picture that precedes the current picture in decoding order. For example, the coder may refrain from coding any picture (or causing any picture to be provided) in a bitstream after the current picture if the picture is to be output before any picture preceding the current picture in decoding order, to ensure that the coded bitstream conforms to the bitstream constraint.

POC MSB Cycle

In some embodiments of the present disclosure, the coder may signal an offset value that may be referred to as a POC MSB cycle. In one example, the POC MSB cycle may indicate the difference between the POC MSB of a previously coded picture and the POC MSB of the current picture. In such an example, the coder may use the POC MSB cycle to update the POC values of pictures that precede the picture with which the POC MSB cycle is associated. In another example, the POC MSB cycle may be identical to the POC MSB of the picture with which the POC MSB cycle is associated. Thus, when the POC MSB cycle is signaled in association with a particular picture, the POC MSB of the particular picture may be calculated based on the signaled POC MSB cycle.

Signaling of POC MSB Cycle with CRA and BLA Pictures

In some embodiments of the present disclosure, for CRA and BLA pictures, the value of the signaled POC MSB cycle is determined relative to the previous POC reset picture in the same layer or the previous IDR picture in the same layer, whichever is closer. If neither is present (e.g., meaning that the CRA/BLA picture is the first CRA/BLA picture in the layer), the POC MSB cycle of the CRA/BLA picture may be any value in the allowed range of the POC MSB cycle values.

POC MSB Cycle in POC Reset Pictures

In some embodiments of the present disclosure, when a CRA or a BLA picture in a particular layer is also a POC reset picture, then the signaled value of the POC MSB cycle is used to update the POC values of all pictures in the DPB in the particular layer. If the CRA or BLA picture is also a POC reset picture, the MSB of the CRA or BLA picture may be zero. When the CRA or BLA picture in the particular layer is not a POC reset picture, the signaled value of the POC MSB cycle is used to calculate the POC of the CRA or BLA picture.

In some embodiments of the present disclosure, the POC MSB cycle may be signaled for IDR pictures. When an IDR picture in a particular layer is also a POC reset picture, then the signaled value of the POC MSB cycle is used to update the POC values of all pictures in the DPB in the particular layer. When the IDR picture in the particular layer is not a POC reset picture, the signaled value of the POC MSB cycle is used to calculate the POC of the IDR picture.

Figure 8:
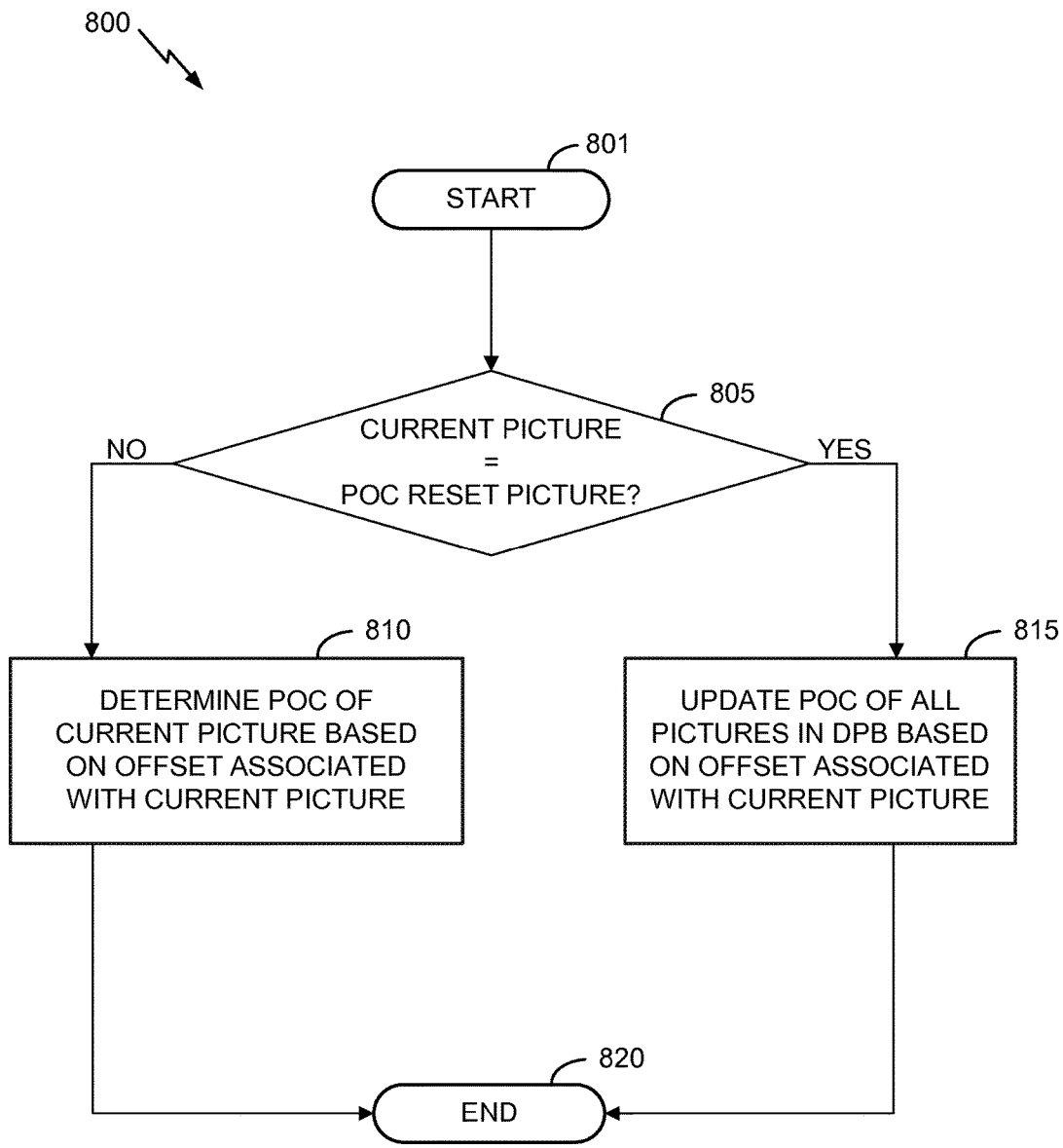
FIG. 8 is a flow chart illustrating a method of coding video information, according to one embodiment of the present disclosure.

FIG. 8 is a flowchart illustrating a method 800 for coding video information, according to an embodiment of the present disclosure. The steps illustrated in FIG. 8 may be performed by an encoder (e.g., the video encoder as shown in FIG. 2A or FIG. 2B), a decoder (e.g., the video decoder as shown in FIG. 3A or FIG. 3B), or any other component. For convenience, method 800 is described as performed by a coder, which may be the encoder, the decoder, or another component.

The method 800 begins at block 801. At block 805, the coder determines whether a current picture in a video layer is a POC reset picture. If the coder determines that the current picture is not a POC reset picture, the method 800 proceeds to block 810. On the other hand, if the coder determines that the current picture is a POC reset picture, the method 800 proceeds to block 815.

At block 810, the coder determines the POC of the current picture based on an offset associated with the current picture. The offset may indicate the difference between the POC MSB of the current picture and the POC MSB of another previously decoded picture in the same layer. At block 815, the coder updates the POC of all pictures in the DPB that are in the same layer as the current picture based on the offset associated with the current picture. For example, the coder may update the POC of all pictures in the DPB by subtracting a value from the POC of each picture in the DPB. In one example, the subtracted value may be determined based on the offset associated with the current picture. In another example, the subtracted value may be what the POC of the current picture would have been without the POC reset. The method 800 ends at 820.

As discussed above, one or more components of video encoder 20 of FIG. 2A, video encoder 23 of FIG. 2B, video decoder 30 of FIG. 3A, or video decoder 33 of FIG. 3B (e.g., inter-layer prediction unit 128 and/or inter-layer prediction unit 166) may be used to implement any of the techniques discussed in the present disclosure, such as determining whether the current picture is a POC reset picture, determining the POC of the current picture based on the offset associated with the current picture, and updating the POC of all the pictures in the DPB based on the offset associated with the current picture.

In the method 800, one or more of the blocks shown in FIG. 8 may be removed (e.g., not performed), modified, and/or the order in which the method is performed may be switched. For example, although block 810 is shown in FIG. 8, block 810 may be removed, and the method 800 may end without performing any additional operations if the coder determines that the current picture is not a POC reset. Alternatively, block 815 may be removed, and the method 800 may end without performing any additional operations if the coder determines that the picture is a POC reset picture. Thus, the embodiments of the present disclosure are not limited to or by the example shown in FIG. 8, and other variations may be implemented without departing from the spirit of this disclosure.

Signaling Presence of POC MSB Cycle

In some embodiments of the present disclosure, a flag or syntax element may be signaled in the VPS that specifies whether the POC MSB cycle is signaled (e.g., in the slice header) for the CRA and BLA pictures. The signaling of the POC MSB cycle may be based on the flag or syntax element included in the VPS. The determination of whether to signal the POC MSB cycle may be made based on the flag or syntax element included in the VPS.

POC MSB Cycle in IRAP Pictures

In some implementations, the coder may perform a POC reset to align the POCs in a non-aligned AU (e.g., an TRAP picture and a non-RAP picture in the same AU). In such a case, the poc_reset_idc may be set to a value greater than a value of 0, to indicate that a POC reset is to be performed. However, such a POC reset may not be needed if the POC MSB cycle is signaled along with a CRA or BLA picture, as described above.

In some embodiments of the present disclosure, when the POC MSB cycle is signaled for an TRAP picture having a particular nal_unit_type value (e.g., IDR, CRA, BLA, etc.), and an AU contains a non-TRAP picture with nuh_layer_id equal to a value of 0 and at least one TRAP with the same nal_unit_type value as the IRAP picture, the poc_reset_idc associated with the AU (e.g., associated with the non-IRAP picture or the IRAP picture) may be either set equal to a value of 0 or set to be greater than a value of 0, thereby rendering removing the bitstream constraint described above.

Static Layer-Wise POC

In some embodiments of the present disclosure, an additional POC that specifies the POC value of a decoded picture before any POC reset processes have been invoked. This POC may be referred to as a layer-wise POC. The value of this layer-wise POC may be computed from information signaled in the picture, slice header, or other pictures in the same layer without using additional information from pictures in other layers. The layer-wise POC could be used for any processes that may desire a static POC value that is not affected by other procedures (e.g., a POC reset) for picture identification. For example, such processes may use the layer-wise POC for picture identification in reference pictures set decoding, for picture identification in decoding of SEI messages, and for any post-processing on decoding pictures. When a layer-wise POC is used, the POC values of the earlier pictures in the DPB need not be decremented when a POC reset is performed.

In some embodiments of the present disclosure, to implement the layer-wise POC, least significant bits (LSB) of the layer-wise POC are signaled in the POC reset picture or whenever the value of poc_reset_idc is not equal to a value of 0. This LSB information may be used to derive both the POC and the layer-wise POC. The most significant bits of the POC may be signaled in the slice header extension of IRAP picture. This MSB information may be used to derive both the POC and the layer-wise POC.

In some embodiments of the present disclosure, for any process that may use POC-related information, the POC is used (e.g., to keep backward compatibility to the single-layer version of HEVC) for the base layer, and the layer-wise POC is used for other layers.

POC-Resetting Period ID in Feedback Messages

In some embodiments of the present disclosure, when operating in the context of an SHVC or MV-HEVC profile, in addition to the POC value and the layer ID, the POC resetting period ID of the latest decoded picture is also signaled in a feedback message for identifying the latest decoded picture. The encoder can then uniquely identify the previously encoded picture. For example, a current decoded picture may have a reference picture in its reference picture set (RPS) but the decoder may not have access to the reference picture (e.g., due to a loss during transmission). In this example, the decoder may send a feedback message to the encoder, requesting that the encoder resend the reference picture. The feedback message may include a POC value associated with the reference picture and a POC resetting period associated with the reference picture, and the encoder may use the POC value and the POC resetting period to identify the reference picture. For example, upon receiving a feedback message with a POC value and a POC resetting period ID, if the latest decoded picture corresponding to the signaled POC value happens to be in a different POC resetting period than the latest encoded picture, the signaled POC resetting period ID would be used to track back to the correct POC resetting period, adding a POC delta value for each POC resetting period present between the two POC resetting periods.

Example Implementation #1

Example implementations of one or more of the embodiments described above are provided below. Changes to the syntax, semantics, and the decoding process indicated below in italics are with respect to those provided in MV-HEVC WD6. These changes implement various embodiments described in the present application. The reference numbers used below (e.g., subclause 5.8, section 8.1, etc.) refer to sections in MV-HEVC WD6.

Addition of a Mathematical Relationship

In one embodiment, the following relationship is incorporated into subclause 5.8:

$$GetCurrMsb(cl, pl, pm, ml) = \begin{cases} pm + ml; & pl - cl >= ml/2 \\ om - ml; & cl - pl > ml/2 \\ pm; & \text{otherwise} \end{cases}$$

Changes to Slice Decoding Process
In one embodiment, the following changes are made to Section 8.1 General decoding process.

When NoClrasOutputFlag is equal to 1, the variable LayerInitializedFlag[i] is set equal to 0 for all values of i from 0 to vps_max_layer_id, inclusive, and the variable FirstPicInLayerDecodedFlag[i] is set equal to 0 for all values of i from 0 to vps_max_layer_id, inclusive.

Changes to 8.3.1. Decoding Process for Picture Order Count
8.3.1 Decoding Process for Picture Order Count Output of this process is PicOrderCntVal, the picture order count of the current picture.

Picture order counts are used to identify pictures, for deriving motion parameters in merge mode and motion vector prediction, and for decoder conformance checking (see subclause 11).

Each coded picture is associated with a picture order count variable, denoted as PicOrderCntVal.

When the current picture is not an TRAP picture with NoRaslOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL picture, a RADL picture, or a sub-layer non-reference picture, and PrevPicOrderCnt[nuh_layer_id] be the PicOrderCntVal of prevTid0Pic.

The variable prevPicOrderCntLsb is set equal to PrevPicOrderCnt[nuh_layer_id] & (MaxPicOrderCntLsb−1).

The variable prevPicOrderCntMsb is set equal to PrevPicOrderCnt[nuh_layer_id]−prevPicOrderCntLsb.

The variable PicOrderCntMsb of the current picture is derived as follows:

If the current picture is an IRAP picture with NoRaslOutputFlag equal to 1, PicOrderCntMsb is set equal to 0.

Otherwise, PicOrderCntMsb is derived as follows:

```
if( ( slice_pic_order_cnt_lsb < prevPicOrderCntLsb ) &&
     ( ( prevPicOrderCntLsb − slice_pic_order_cnt_lsb ) >=
   ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
     ( ( slice_pic_order_cnt_lsb − prevPicOrderCntLsb ) >
   ( MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+slice_pic_order_cnt_lsb

NOTE 1—All IDR pictures will have PicOrderCntVal equal to 0 since slice_pic_order_cnt_lsb is inferred to be 0 for IDR pictures and prevPicOrderCntLsb and prevPicOrderCntMsb are both set equal to 0.

The value of PicOrderCntVal shall be in the range of $-2^{31}$ to $2^{31}-1$, inclusive. In one CVS, the PicOrderCntVal values for any two coded pictures shall not be the same.

The function PicOrderCnt(picX) is specified as follows:

PicOrderCnt(picX)=PicOrderCntVal of the picture picX

The function DiffPicOrderCnt(picA, picB) is specified as follows:

DiffPicOrderCnt(picA,picB)=PicOrderCnt(picA)−PicOrderCnt(picB)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

Modification of Semantics of SEI Messages
In one embodiment, subclause D.3.4 is modified as follows:

pan_scan_rect_persistence_flag specifies the persistence of the pan-scan rectangle SEI message.

pan_scan_rect_persistence_flag equal to 0 specifies that the pan-scan rectangle information applies to the current decoded picture only.

Let picA be the current picture. pan_scan_rect_persistence_flag equal to 1 specifies that the pan-scan rectangle information persists in output order until any of the following conditions are true:

A new CVS begins.

The bitstream ends.

A picture picB in an access unit containing a pan-scan rectangle SEI message with the same value of pan_scan_rect_id is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

In one embodiment, subclause D.3.8 is modified as follows:

When random access is performed to start decoding from the access unit associated with the recovery point SEI message, the decoder operates as if the associated picture was the first picture in the bitstream in decoding order, and the variable PrevPicOrderCnt[nuh_layer_id] used in derivation of PicOrderCntVal is set equal to 0.

NOTE 2—When HRD information is present in the bitstream, a buffering period SEI message should be associated with the access unit associated with the recovery point SEI message in order to establish initialization of the HRD buffer model after a random access.

Any SPS or PPS RBSP that is referred to by a picture associated with a recovery point SEI message or by any picture following such a picture in decoding order shall be available to the decoding process prior to its activation, regardless of whether or not the decoding process is started at the beginning of the bitstream or with the access unit, in decoding order, that is associated with the recovery point SEI message.

recovery_poc_cnt specifies the recovery point of decoded pictures in output order. If there is a picture picB that follows the current picture (i.e. the picture associated with the current SEI message) picA in decoding order in the CVS and PicOrderCnt(picB) is equal to PicOrderCnt(picA) plus the value of recovery_poc_cnt, where PicOrderCnt(picA) and PicOrderCnt(picB) are the PicOrderCntVal values of picA and picB, respectively, immediately after the invocation of the decoding process for picture order count for picB, the picture picB is referred to as the recovery point picture. Otherwise, the first picture picC in output order for which PicOrderCnt(picC) is greater than PicOrderCnt(picA) plus the value of recovery_poc_cnt is referred to as the recovery point picture, where PicOrderCnt(picA) and PicOrderCnt(picC) are the PicOrderCntVal values of picA and picC, respectively, immediately after the invocation of the decoding process for picture order count for picC. The recovery point picture shall not precede the current picture in decoding order. All decoded pictures in output order are indicated to be correct or approximately correct in content starting at the output order position of the recovery point picture. The value of recovery_poc_cnt shall be in the range of −MaxPicOrderCntLsb/2 to MaxPicOrderCntLsb/2−1, inclusive.

In one embodiment, subclause D.3.11 is modified as follows:

The progressive refinement segment start SEI message specifies the beginning of a set of consecutive coded pictures in decoding order that consists of the current picture and a sequence of one or more subsequent pictures of refinement of the quality of the current picture, rather than a representation of a continually moving scene.

Let picA be the current picture. The tagged set of consecutive coded pictures continues until one of the following conditions is true:
  A new CVS begins.
  The bitstream ends.
  pic_order_cnt_delta is greater than 0 and the PicOrderCntVal of the next slice, which belongs to the picture picB, to be decoded, i.e. PicOrderCnt(picB), is greater than PicOrderCnt(picA) plus pic_order_cnt_delta, where PicOrderCnt(picB) and PicOrderCnt(picA) are the PicOrderCntVal values of picB and picA, respectively, immediately after the invocation of the decoding process for picture order count for picB.
  A progressive refinement segment end SEI message with the same progressive_refinement_id as the one in this SEI message is decoded.

The decoding order of pictures within the tagged set of consecutive pictures should be the same as their output order.

progressive_refinement_id specifies an identification number for the progressive refinement operation. progressive_refinement_id shall be in the range of 0 to $2^{32}-2$, inclusive. Values of progressive_refinement_id in the range of 0 to 255, inclusive, and in the range of 512 to $2^{31}-1$, inclusive, may be used as determined by the application. Values of progressive_refinement_id in the range of 256 to 511, inclusive, and in the range of $2^{31}$ to $2^{32}-2$, inclusive, are reserved for future use by ITU-T|ISO/IEC. Decoders encountering a value of progressive_refinement_id in the range of 256 to 511, inclusive, or in the range of $2^{31}$ to $2^{32}-2$, inclusive, shall ignore it.

pic_order_cnt_delta specifies the last picture in the tagged set of consecutive coded pictures in decoding order as follows:
  If pic_order_cnt_delta is equal to 0, the last picture of the tagged set of consecutive coded pictures in decoding order is the following picture:
    If the CVS contains one or more pictures that follow the current picture in decoding order and are associated with a progressive refinement segment end SEI message with the same progressive_refinement_id, the last picture of the tagged set of consecutive coded pictures in decoding order is the first of these pictures in decoding order.
    Otherwise, the last picture of the tagged set of consecutive coded pictures in decoding order is the last picture of the CVS in decoding order.
  Otherwise, the last picture of the tagged set of consecutive coded pictures in decoding order is the following picture:
    If the CVS contains one or more pictures that follow the current picture in decoding order and are associated with a progressive refinement segment end SEI message with the same progressive_refinement_id and precede any picture picC in the CVS for which PicOrderCnt(picC) is greater than PicOrderCnt(picA) plus pic_order_cnt_delta, where PicOrderCnt(picC) and PicOrderCnt(picA) are the PicOrderCntVal values of picC and picA, respectively, immediately after the invocation of the decoding process for picture order count for picC, the last picture of the tagged set of consecutive coded pictures in decoding order is the first of these pictures in decoding order.
    Otherwise, if the CVS contains one or more pictures picD that follow the current picture in decoding order for which PicOrderCnt(picD) is greater than PicOrderCnt(picA) plus pic_order_cnt_delta, where PicOrderCnt(picD) and PicOrderCnt(picA) are the PicOrderCntVal values of picD and picA, respectively, immediately after the invocation of the decoding process for picture order count for picD, the last picture of the tagged set of consecutive coded pictures in decoding order is the last picture that precedes the first of these pictures in decoding order.
    Otherwise, the last picture of the tagged set of consecutive coded pictures in decoding order is the last picture of the CVS in decoding order.

The value of pic_order_cnt_delta shall be in the range of 0 to 256, inclusive.

In one embodiment, subclause D.3.13 is modified as follows:

film_grain_characteristics_persistence_flag specifies the persistence of the film grain characteristics SEI message.

film_grain_characteristics_persistence_flag equal to 0 specifies that the film grain characteristics SEI message applies to the current decoded picture only.

Let picA be the current picture. film_grain_characteristics_persistence_flag equal to 1 specifies that the film grain characteristics SEI message persists in output order until any of the following conditions are true:
  A new CVS begins.
  The bitstream ends.
  A picture picB in an access unit containing a film grain characteristics SEI message is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

In one embodiment, subclause D.3.14 is modified as follows:

tone_map_persistence_flag specifies the persistence of the tone mapping information SEI message.

tone_map_persistence_flag equal to 0 specifies that the tone mapping information applies to the current decoded picture only.

Let picA be the current picture. tone_map_persistence_flag equal to 1 specifies that the tone mapping information persists in output order until any of the following conditions are true:
  A new CVS begins.
  A picture picB in an access unit containing a tone mapping information SEI message with the same value of tone_map_id is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

In one embodiment, subclause D.3.16 is modified as follows:

frame_packing_arrangement_persistence_flag specifies the persistence of the frame packing arrangement SEI message.

frame_packing_arrangement_persistence_flag equal to 0 specifies that the frame packing arrangement SEI message applies to the current decoded frame only.

Let picA be the current picture. frame_packing_arrangement_persistence_flag equal to 1 specifies that the frame packing arrangement SEI message persists in output order until any of the following conditions are true:

A new CVS begins.

The bitstream ends.

A frame picB in an access unit containing a frame packing arrangement SEI message with the same value of frame_packing_arrangement_id is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

In one embodiment, subclause D.3.17 is modified as follows:

display_orientation_persistence_flag specifies the persistence of the display orientation SEI message.

display_orientation_persistence_flag equal to 0 specifies that the display orientation SEI message applies to the current decoded picture only.

Let picA be the current picture. display_orientation_persistence_flag equal to 1 specifies that the display orientation SEI message persists in output order until one or more of the following conditions are true:

A new CVS begins.

The bitstream ends.

A picture picB in an access unit containing a display orientation SEI message is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

The semantics of the structure of pictures information SEI message specified in subclause D.3.18 are replaced with the following:

The structure of pictures information SEI message provides information for a list of entries, some of which correspond to the target picture set consists of a series of pictures starting from the current picture until the last picture in decoding order in the CVS or the last picture in decoding order in the current POC resetting period, whichever is earlier.

The first entry in the structure of pictures information SEI message corresponds to the current picture. When there is a picture in the target picture set that has PicOrderCntVal equal to the variable entryPicOrderCnt[i] as specified below, the entry i corresponds to a picture in the target picture set. The decoding order of the pictures in the target picture set that correspond to entries in the structure of pictures information SEI message corresponds to increasing values of i in the list of entries.

Any picture picB in the target picture set that has PicOrderCntVal equal to entryPicOrderCnt[i] for any i in the range of 0 to num_entries_in_sop_minus1, inclusive, where PicOrderCntVal is the value of PicOrderCntVal of picB immediately after the invocation of the decoding process for picture order count for picB, shall correspond to an entry in the list of entries.

The structure of pictures information SEI message shall not be present in a CVS for which the active SPS has long_term_ref_pics_present_flag equal to 1 or num_short_term_ref_pic_sets equal to 0.

The structure of pictures information SEI message shall not be present in any access unit that has TemporalId greater than 0 or contains a RASL, RADL or sub-layer non-reference picture. Any picture in the target picture set that corresponds to an entry other than the first entry described in the structure of pictures information SEI message shall not be an IRAP picture.

sop_seq_parameter_set_id indicates and shall be equal to the sps_seq_parameter_set_id value of the active SPS. The value of sop_seq_parameter_set_id shall be in the range of 0 to 15, inclusive.

num_entries_in_sop_minus1 plus 1 specifies the number of entries in the structure of pictures information SEI message. num_entries_in_sop_minus1 shall be in the range of 0 to 1023, inclusive.

sop_vcl_nut[i], when the i-th entry corresponds to a picture in the target picture set, indicates and shall be equal to the nal_unit_type value of the picture corresponding to the i-th entry.

sop_temporal_id[i], when the i-th entry corresponds to a picture in the target picture set, indicates and shall be equal to the TemporalId value of the picture corresponding to the i-th entry. The value of 7 for sop_temporal_id[i] is reserved for future use by ITU-T|ISO/IEC and shall not be present in bitstreams conforming to this version of this Specification. Decoders shall ignore structure of pictures information SEI messages that contain the value 7 for sop_temporal_id[i].

sop_short_term_rps_idx[i], when the i-th entry corresponds to a picture in the target picture set, indicates and shall be equal to the index, into the list of candidate short-term RPSs included in the active SPS, of the candidate short-term RPS used by the picture corresponding to the i-th entry for derivation of the short-term reference picture set. sop_short_term_rps_idx[i] shall be in the range of 0 to num_short_term_ref_pic_sets−1, inclusive.

sop_poc_delta[i] is used to specify the value of the variable entryPicOrderCnt[i] for the i-th entry described in the structure of pictures information SEI message. sop_poc_delta[i] shall be in the range of (−MaxPicOrderCntLsb)/2+1 to MaxPicOrderCntLsb/2−1, inclusive.

The variable entryPicOrderCnt[i] is derived as follows:

entryPicOrderCnt[0]=PicOrderCnt(currPic)

for (i=1; i<=num_entries_in_sop_minus1; i++)

entryPicOrderCnt[$i$]=entryPicOrderCnt[$i$−1]+sop_poc_delta[$i$]

where currPic is the current picture.

In one embodiment, subclause D.3.24 is modified as follows:

The region refresh information SEI message indicates whether the slice segments that the current SEI message applies to belong to a refreshed region of the current picture (as defined below).

An access unit that is not an IRAP access unit and that contains a recovery point SEI message is referred to as a gradual decoding refresh (GDR) access unit, and its corresponding picture is referred to as a GDR picture. The access unit corresponding to the indicated recovery point picture is referred to as the recovery point access unit.

If there is a picture picB that follows the GDR picture picA in decoding order in the CVS and PicOrderCnt(picB) is equal to PicOrderCnt(picA) plus the value of recovery_poc_cnt in the recovery point SEI message, where PicOrderCnt(picA) and PicOrderCnt(picB) are the PicOrderCntVal values of picA and picB, respectively, immediately after the invocation of the decoding process for picture order count for picB, let the variable lastPicInSet be the recovery point picture. Otherwise, let lastPicInSet be the picture that immediately precedes the recovery point picture in output order. The picture lastPicInSet shall not precede the GDR picture in decoding order.

Addition of a Syntax Function

In one embodiment, more_data_in_slice_segment_header_extension( ) is specified as follows:

If (the current position in the slice_segment_header( ) syntax structure)−(the position immediately following slice_segment_header_extension_length) is less than (slice_segment_header_extension_length*8), the return value of more_data_in_slice_segment_header_extension( ) is equal to TRUE.

Otherwise, the return value of more_data_in_slice_segment_header_extension( ) is equal to FALSE.

Addition of Two Definitions

In one embodiment, the following definitions are added to subclause F.3:

picture order count (POC) resetting period: A sequence of access units in decoding order, starting with an access unit with poc_reset_idc equal to 1 or 2 and a particular value of poc_reset_period_id and including all access units that either have the same value of poc_reset_period_id or have poc_reset_idc equal to 0.

picture order count (POC) resetting picture: A picture that is the first picture, in decoding order, of a layer of a POC resetting period.

Video Parameter Set Extension Syntax and Semantics

TABLE 1

Example syntax of vps_extension( )

| vps_extension( ) { | Descriptor |
|---|---|
| avc_base_layer_flag | u(1) |
| ... | |
|     direct_dependency_type[ i ][ j ] | u(v) |
| } | |
| *vps_poc_msb_present_flag* | u(1) |
| vps_shvc_reserved_zero_flag | u(1) |
| if( vps_vui_present_flag ) { | |
|   while( !byte_aligned( ) ) | |
|     vps_vui_alignment_bit_equal_to_one | u(1) |
|   vps_vui( ) | |
| } | |
| } | | vps_poc_msb_present_flag equal to 0 specifies that the syntax element poc_msb_val is not present in the slice segment headers of the slice referring to the VPS. vps_poc_msb_present_flag equal to 1 specifies that the syntax element poc_msb_val may be present in the slice segment headers of the slice referring to the VPS.

When the value of vps_poc_msb_present_flag is equal to 0, poc_reset_info_present_flag shall be equal to 0.

Changes to NAL Unit Header Semantics

In one embodiment, the following derivation is added to semantics of NAL unit header semantics:

The variable CraOrBlaPicFlag is derived as follows:
CraOrBlaPicFlag=
  (nal_unit_type==BLA_W_LP||nal_unit_type==BLA_N_LP||nal_unit_type==BLA_W_RADL||nal_unit_type==CRA_NUT)

Picture Parameter Set RBSP Syntax and Semantics

TABLE 2

Example syntax of pic_parameter_set_rbsp( )

| pic_parameter_set_rbsp( ) { | Descriptor |
|---|---|
| ... | |
|   pps_extension_flag | u(1) |
|   if( pps_extension_flag ) { | |
|     poc_reset_info_present_flag | u(1) |
|     pps_extension2_flag | u(1) |
|     if( pps_extension2_flag ) | |
|       while( more_rbsp_data( ) ) | |
|         pps_extension_data_flag | u(1) |
|   } | |
|   rbsp_trailing_bits( ) | |
| } | | pps_extension_flag equal to 0 specifies that no pps_extension_data_flag syntax elements are present in the PPS RBSP syntax structure. When slice_segment_header_extension_present_flag is equal to 0, pps_extension_flag shall be equal to 0 in bitstreams conforming to this version of this Specification, the value of 1 for pps_extension_flag is reserved for future use by ITU-T|ISO/IEC, and decoders shall ignore all data that follow the value 1 for pps_extension_flag in a PPS NAL unit.

poc_reset_info_present_flag equal to 0 specifies that the syntax element poc_reset_idc is not present in the slice segment headers of the slices referring to the PPS. poc_reset_info_present_flag equal to 1 specifies that the syntax element poc_reset_idc is present in the slice segment headers of the slices referring to the PPS.

pps_extension2_flag equal to 0 specifies that no pps_extension_data_flag syntax elements are present in the PPS RBSP syntax structure. pps_extension2_flag shall be equal to 0 in bitstreams conforming to this version of this Specification. The value of 1 for pps_extension2_flag is reserved for future use by ITU-T|ISO/IEC. Decoders shall ignore all data that follow the value 1 for pps_extension2_flag in a PPS NAL unit.

1.1.1 General Slice Segment Header Syntax and Semantics

TABLE 3

Example syntax of slice_segment_header( ) (***: removed)

| slice_segment_header( ) { | | Descriptor |
|---|---|---|
| ... | | |
| if( !dependent_slice_segment_flag ) { | | |
|   i = 0 | | |
|   if( num_extra_slice_header_bits > i ) { | | |
|     i++ | | |
|     discardable_flag | | u(1) |
|   } | | |
|   if( num_extra_slice_header_bits > i ) { | | |
|     i++ | | |
|     cross_layer_bla_flag | | u(1) |
|   } | | |
| ***   if( num_extra_slice_header_bits > i ) { | | |
| ***     i++ | | |
| ***     poc_reset_flag | | *** u(1) |
| ***   } | | |
| ... | | |

TABLE 3-continued

Example syntax of slice_segment_header( ) (\*\*\*: removed)

| slice_segment_header( ) { | Descriptor |
|---|---|
|   if( slice_segment_header_extension_present_flag ) { | |
|     slice_segment_header_extension_length | ue(v) |
|     if( poc_reset_info_present_flag ) | |
|       poc_reset_idc | u(2) |
|       if( poc_reset_idc > 0 ) | |
|         poc_reset_period_id | u(6) |
|       if( poc_reset_idc = = 3 ) { | |
|         full_poc_reset_flag | u(1) |
|         poc_lsb_val | u(v) |
|       } | |
|     if( *vps_poc_msb_present_flag* && *CraOrBlaPicFlag* ) | |
|       poc_msb_val | ue(v) |
|     while( more_data_in_slice_segment_header_extension( ) ) | |
|       slice_segment_header_extension_data_bit | u(1) |
|   } | |
|   byte_alignment( ) | |
| } | |

Alternatively, poc_reset_period_id is signalled using a different number of bits, e.g. coded as u(14).

When present, the value of the slice segment header syntax elements slice_pic_parameter_set_id, pic_output_flag, no_output_of_prior_pics_flag, slice_pic_order_cnt_lsb, short_term_ref_pic_set_sps_flag, short_term_ref_pic_set_idx, num_long_term_sps, num_long_term_pics, slice_temporal_mvp_enabled_flag, discardable_flag, cross_layer_bla_flag, inter_layer_pred_enabled_flag, num_inter_layer_ref_pics_minus1, poc_reset_idc, poc_reset_pic_id, full_poc_reset_flag, poc_lsb_val and poc_msb_val shall be the same in all slice segment headers of a coded picture. When present, the value of the slice segment header syntax elements lt_idx_sps[i], poc_lsb_lt[i], used_by_curr_pic_lt_flag[i], delta_poc_msb_present_flag[i], delta_poc_msb_cycle_lt[i], and inter_layer_pred_layer_idc[i] shall be the same in all slice segment headers of a coded picture for each possible value of i.

(\*\*\* REMOVED: poc_reset_flag equal to 1 specifies that the derived picture order count for the current picture is equal to 0. poc_reset_flag equal to 0 specifies that the derived picture order count for the current picture may or may not be equal to 0. When not present, the value of poc_reset_flag is infeffed to be equal to 0.

NOTE—When poc_reset_flag is equal to 1 in a base-layer picture, PicOrderCntVal is derived differently depending on whether the decoding process of subclause 8.3.1 or subclause F.8.3.1 is applied. Furthermore, when a base-layer picture with poc_reset_flag equal to 1 is prevTid0Pic according to subclause 8.3.1 or F.8.3.1, the variable prevPicOrderCntLsb is derived differently in subclauses 8.3.1 and F.8.3.1. In order to avoid PicOrderCntMsb to be updated incorrectly in one of the subclauses 8.3.1 or F.8.3.1, when prevTid0Pic is a base-layer picture with poc_reset_flag equal to 1 and either of the following conditions is true for prevPicOrderCntLsb derived with one of the subclauses 8.3.1 or F.8.3.1, the value of pic_order_cnt_lsb of prevTid0Pic shall be such that the same condition is true also for prevPicOrderCntLsb derived with the other one of the subclauses 8.3.1 or F.8.3.1:

(slice_pic_order_cnt_lsb<prevPicOrderCntLsb) && ((prevPicOrderCntLsb−slice_pic_order_cnt_lsb)>= (MaxPicOrderCntLsb/2))

(slice_pic_order_cnt_lsb>prevPicOrderCntLsb) && ((slice_pic_order_cnt_lsb−prevPicOrderCntLsb)> (MaxPicOrderCntLsb/2))\*\*\*)

poc_reset_idc equal to 0 specifies that neither the most significant bits nor the least significant bits of the picture order count value for the current picture are reset. poc_reset_idc equal to 1 specifies that only the most significant bits of the picture order count value for the current picture may be reset. poc_reset_idc equal to 2 specifies that both the most significant bits and the least significant bits of the picture order count value for the current picture may be reset. poc_reset_idc equal to 3 specifies that either only the most significant bits or both the the most significant bits and the least significant bits of the picture order count value for the current picture may be reset and additional picture order count information is signalled. When not present, the value of poc_reset_idc is inferred to be equal to 0.

It is a requirement of bitstream conformance that the following constraints apply:

The value of poc_reset_idc shall not be equal to 1 or 2 for a RASL picture, a RADL picture, a sub-layer non-reference picture, a picture that has TemporalId greater than 0, or a picture that has discardable_flag equal to 1.

The value of poc_reset_idc of all pictures in an access unit shall be the same.

When the picture in an access unit with nuh_layer_id equal to 0 is an TRAP picture with a particular value of nal_unit_type and there is at least one other picture in the same access unit with a different value of nal_unit_type, the value of poc_reset_idc shall be equal to 1 or 2 for all pictures in the access unit.

When there is at least one picture that has nuh_layer_id greater than 0 and that is an IDR picture with a particular value of nal_unit_type in an access unit and there is at least one other picture in the same access unit with a different value of nal_unit_type, the value of poc_reset_idc shall be equal to 1 or 2 for all pictures in the access unit.

The value of poc_reset_idc of a CRA or BLA picture shall less than 3.

When the picture with nuh_layer_id equal to 0 in an access unit is an IDR picture and there is at least one non-IDR picture in the same access unit, the value of poc_reset_idc shall be equal to 2 for all pictures in the access unit.

When the picture with nuh_layer_id equal to 0 in an access unit is not an IDR picture, the value of poc_reset_idc shall not be equal to 2 for any picture in the access unit.

The value of poc_reset_idc of an access unit is the value of poc_reset_idc of the pictures in the access unit.

poc_reset_period_id identifies a POC resetting period. There shall be no two pictures consecutive in decoding order in the same layer that have the same value of poc_reset_period_id and poc_reset_idc equal to 1 or 2. When not present, the value of poc_reset_period_id is inferred as follows:

If the previous picture picA that has poc_reset_period_id present in the slice segment header in present in the same layer of the bitstream as the current picture, the value of poc_reset_period_id is inferred to be equal to the value of the poc_reset_period_id of picA.

Otherwise, the the value of poc_reset_period_id is inferred to be equal to 0.

NOTE—It is not prohibited for multiple pictures in a layer to have the same value of poc_reset_period_id and to have poc_reset_idc equal to 1 or 2 unless such pictures occur in two consecutive access units in decoding order. To minimize the likelihood of such two pictures appearing in the bitstream due to picture losses, bitstream extraction, seeking, or splicing operations, encoders should set the value of poc_reset_period_id to be a random value for each POC resetting period (subject to the constraints specified above).

It is a requirement of bitstream conformance that the following constraints apply:

One POC resetting period shall not include more than one access unit with poc_reset_idc equal to 1 or 2.

An access unit with poc_reset_idc equal to 1 or 2 shall be the first access unit in a POC resetting period.

A picture that follows a POC resetting picture in decoding order shall not precede, in output order, another picture that precedes the POC resetting picture in decoding order.

full_poc_reset_flag equal to 1 specifies that both the most significant bits and the least significant bits of the picture order count value for the current picture are reset when the previous picture in decoding order in the same layer does not belong to the same POC resetting period. full_poc_reset_flag equal to 0 specifies that only the most significant bits of the picture order count value for the current picture are reset when the previous picture in decoding order in the same layer does not belong to the same POC resetting period.

poc_lsb_val specifies a value that may be used to derive the picture order count of the current picture. The length of the poc_lsb_val syntax element is log 2_max_pic_order_cnt_lsb_minus4+4 bits.

It is a requirement of bitstream conformance that, when poc_reset_idc is equal to 3, and the previous picture picA in decoding order that is in the same layer as the current picture, that has poc_reset_idc equal to 1 or 2, and that belongs to the same POC resetting period is present in the bitstream, picA shall be the same picture as the previous picture in decoding order that is in the same layer as the current picture, that is not a RASL picture, a RADL picture or a sub-layer non-reference picture, and that has TemporalId equal to 0 and discardable_flag equal to 0, and the value of poc_lsb_val of the current picture shall be equal to the value of slice_pic_order_cnt_lsb of picA.

poc_msb_val specifies the value of the most significant bits of the picture order count value of the current picture, which is a CRA or BLA picture. The value of poc_msb_val is also used to derive the value used to decrement the picture order count values of previously decoded pictures in the same layer as the current picture. The value of poc_msb_val shall be in the range of 0 to $2^{32-log\ 2\_max\_pic\_order\_cnt\_lsb\_minus4-4}$, inclusive. The value of poc_msb_val shall be equal to the difference between the values of the most significant bits of the picture order counts of the current picture and the previous POC resetting picture in the same layer or the previous IDR picture in the same layer, whichever is closer, in decoding order, to the current picture. If neither picture is present, the value of poc_msb_val can be any value in the allowed range.

Decoding Process for a Coded Picture with nuh_layer_id Equal to 0

In one embodiment, subclause 8.1.1 of the specification is changed as follows:

The references to subclauses 8.2, 8.3, 8.3.1, 8.3.2, 8.3.3, 8.3.4, 8.4, 8.5, 8.6, and 8.7 are replaced with references to subclauses F.8.2, F.8.3, F.8.3.1, F.8.3.2, F.8.3.3, F.8.3.4, F.8.4, F.8.5, F.8.6, and F.8.7, respectively.

At the end of the subclause, item 5 as provided below is added:

1. When FirstPicInLayerDecodedFlag[0] is equal to 0, FirstPicInLayerDecodedFlag[0] is set equal to 1.

Decoding Process for Starting the Decoding of a Coded Picture with nuh_layer_id Greater than 0

Each picture referred to in this subclause is a complete coded picture.

The decoding process operates as follows for the current picture CurrPic:

1. The decoding of NAL units is specified in subclause F.8.2.
2. The processes in subclause F.8.3 specify the following decoding processes using syntax elements in the slice segment layer and above:

Variables and functions relating to picture order count are derived in subclause F.8.3.1. This needs to be invoked only for the first slice segment of a picture. It is a requirement of bitstream conformance that PicOrderCntVal shall remain unchanged within an access unit.

The decoding process for RPS in subclause F.8.3.2 is invoked, wherein only reference pictures with a nuh_layer_id equal to that of CurrPic may be marked as "unused for reference" or "used for long-term reference" and any picture with a different value of nuh_layer_id is not marked. This needs to be invoked only for the first slice segment of a picture.

When FirstPicInLayerDecodedFlag[nuh_layer_id] is equal to 0, the decoding process for generating unavailable reference pictures specified in subclause F.8.1.5 is invoked, which needs to be invoked only for the first slice segment of a picture.

When FirstPicInLayerDecodedFlag[nuh_layer_id] is not equal to 0 and the current picture is an TRAP picture with NoRaslOutputFlag equal to 1, the decoding process for generating unavailable reference pictures specified in subclause F.8.3.3 is invoked, which needs to be invoked only for the first slice segment of a picture.

Decoding Process for Picture Order Count

Output of this process is PicOrderCntVal, the picture order count of the current picture.

Picture order counts are used to identify pictures, for deriving motion parameters in merge mode and motion vector prediction, and for decoder conformance checking (see subclause C.5).

Each coded picture is associated with a picture order count variable, denoted as PicOrderCntVal.

(***REMOVED: If FirstPicInLayerDecodedFlag [nuh_layer_id] is equal to 0 or the current picture is an TRAP picture with NoRaslOutputFlag equal to 1, the variable PicOrderCntMsb is set equal to 0. Otherwise, PicOrderCntMsb is derived as follows:

The variable prevPicOrderCntLsb is set equal to PrevPicOrderCnt[nuh_layer_id] & (MaxPicOrderCntLsb−1).

The variable prevPicOrderCntMsb is set equal to PrevPicOrderCnt[nuh_layer_id]−prevPicOrderCntLsb.

PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >=
  ( MaxPicOrderCntLsb / 2 ) ) )
  PicOrderCntMsb = prevPicOrderCntMsb + MaxPicOrderCntLsb
else if( (slice_pic_order_cnt_lsb > prevPicOrderCntLsb ) &&
    ( (slice_pic_order_cnt_lsb − prevPicOrderCntLsb ) >
  ( MaxPicOrderCntLsb / 2 ) ) )
  PicOrderCntMsb = prevPicOrderCntMsb − MaxPicOrderCntLsb
```

```
else
    PicOrderCntMsb = prevPicOrderCntMsb
PicOrderCntVal is derived as follows:
PicOrderCntVal = PicOrderCntMsb + slice_pic_order_cnt_lsb
```

When poc_reset_flag is equal to 1, the following steps apply in the order listed:

The PicOrderCntVal of each picture that is in the DPB and belongs to the same layer as the current picture is decremented by PicOrderCntVal.

PrevPicOrderCnt[nuh_layer_id] is decremented by PicOrderCntVal.

PicOrderCntVal is set equal to 0.

When the current picture is not a RASL picture, a RADL picture or a sub-layer non-reference picture, and the current picture has TemporalId equal to 0, PrevPicOrderCnt[nuh_layer_id] is set equal to PicOrderCntVal.***)

If FirstPicInLayerDecodedFlag[nuh_layer_id] is equal to 1 and the current picture is a POC resetting picture, the following applies:

The variables pocMsbDelta, pocLsbDelta and DeltaPocVal are derived as follows:

```
if( poc_reset_idc = = 3 )
    pocLsbVal = poc_lsb_val
else
    pocLsbVal = slice_pic_order_cnt_lsb
if( vps_poc_msb_present_flag && CraOrBlaPicFlag )
    pocMsbDelta = poc_msb_val * MaxPicOrderCntLsb
else {
    prevPicOrderCntLsb =
PrevPicOrderCnt[ nuh_layer_id ] & ( MaxPicOrderCntLsb − 1 )
    prevPicOrderCntMsb =
PrevPicOrderCnt[ nuh_layer_id ] − prevPicOrderCntLsb
    pocMsbDelta = getCurrMsb( pocLsbVal, prevPicOrderCntLsb,
prevPicOrderCntMsb, MaxPicOrderCntLsb )
}
if( poc_reset_idc = = 2 || ( poc_reset_idc = = 3 &&
full_poc_reset_flag ) )
    pocLsbDelta = pocLsbVal
else
    pocLsbDelta = 0
DeltaPocVal = pocMsbDelta + pocLsbDelta
```

The PicOrderCntVal of each picture that is in the DPB and belongs to the same layer as the current picture is decremented by DeltaPocVal.

The PicOrderCntVal of the current picture is derived as follows:

```
if( poc_reset_idc = = 1 )
    PicOrderCntVal = slice_pic_order_cnt_lsb
else if( poc_reset_idc = = 2 )
    PicOrderCntVal = 0
else { // poc_reset_idc = = 3
    PicOrderCntMsb = getCurrMsb( slice_pic_order_cnt_lsb,
full_poc_reset_flag ?
0 : poc_lsb_val,
0, MaxPicOrderCntLsb )
    PicOrderCntVal = PicOrderCntMsb + slice_pic_order_cnt_lsb
}
```

The value of PrevPicOrderCnt[nuh_layer_id] is derived as follows:

If the current picture is not a RASL picture, a RADL picture, or a sub-layer non-reference picture, and the current picture has TemporalId equal to 0 and discardable_flag equal to 0, PrevPicOrderCnt[nuh_layer_id] is set equal to PicOrderCntVal.

Otherwise when poc_reset_idc is equal to 3, PrevPicOrderCnt[nuh_layer_id] is set equal to full_poc_reset_flag? 0:poc_lsb_val.

Otherwise, the following applies:

The PicOrderCntVal of the current picture is derived as follows:

```
if( !FirstPicInLayerDecodedFlag[ nuh_layer_id ] ) {
    if( poc_reset_idc = = 1 )
        PicOrderCntVal = slice_pic_order_cnt_lsb
    else if( poc_reset_idc = = 2 )
        PicOrderCntVal = 0
    else if( poc_reset_idc = = 3 ) {
        PicOrderCntMsb = getCurrMsb(slice_pic_order_cnt_lsb,
full_poc_reset_flag ? 0 : poc_lsb_val,
                 0, MaxPicOrderCntLsb )
        PicOrderCntVal = PicOrderCntMsb + slice_pic_order_cnt_lsb
    } else {
        if( vps_poc_msb_present_flag && CraOrBlaPicFlag ) {
            PicOrderCntMsb = poc_msb_val * MaxPicOrderCntLsb
            PicOrderCntVal = PicOrderCntMsb +
                slice_pic_order_cnt_lsb
        }
        else
            PicOrderCntVal = slice_pic_order_cnt_lsb
    }
} else {
    if( vps_poc_msb_present_flag && CraOrBlaPicFlag )
        PicOrderCntMsb = poc_msb_val * MaxPicOrderCntLsb
    else if( the current picture is an IRAP picture with NoRaslOutputFlag
equal to 1 )
        PicOrderCntMsb = 0
    else {
        prevPicOrderCntLsb =
PrevPicOrderCnt[ nuh_layer_id ] & ( MaxPicOrderCntLsb − 1 ).
        prevPicOrderCntMsb =
PrevPicOrderCnt[ nuh_layer_id ] − prevPicOrderCntLsb
        PicOrderCntMsb = getCurrMsb( slice_pic_order_cnt_lsb,
prevPicOrderCntLsb, prevPicOrderCntMsb, MaxPicOrderCntLsb )
    }
    PicOrderCntVal = PicOrderCntMsb + slice_pic_order_cnt_lsb
}
```

The value of PrevPicOrderCnt[nuh_layer_id] is derived as follows:

If the current picture is not a RASL picture, a RADL picture or a sub-layer non-reference picture, and the current picture has TemporalId equal to 0 and discardable_flag equal to 0, PrevPicOrderCnt[nuh_layer_id] is set equal to PicOrderCntVal.

Otherwise when FirstPicInLayerDecodedFlag[nuh_layer_id] is equal to 0 and poc_reset_idc is equal to 3, PrevPicOrderCnt[nuh_layer_id] is set equal to full_poc_reset_flag? 0:poc_lsb_val The value of PicOrderCntVal shall be in the range of $-2^{31}$ to $2^{31}-1$, inclusive. In one CVS, the PicOrderCntVal values for any two coded pictures in the same layer shall not be the same.

The function PicOrderCnt(picX) is specified as follows:

PicOrderCnt(picX)=PicOrderCntVal of the picture picX

The function DiffPicOrderCnt(picA, picB) is specified as follows:

DiffPicOrderCnt(pic*A*,pic*B*)=PicOrderCnt(pic*A*)−PicOrderCnt(pic*B*)

The bitstream shall not contain data that result in values of DiffPicOrderCnt(picA, picB) used in the decoding process that are not in the range of $-2^{15}$ to $2^{15}-1$, inclusive.

NOTE—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Operation of the Output Order DPB

C.5.2.2 Output and Removal of Pictures from the DPB

When the current picture is not picture 0 in the current layer, the output and removal of pictures in the current layer from the DPB before the decoding of the current picture, i.e. picture n, but after parsing the slice header of the first slice of the current picture and before the invocation of the decoding process for picture order count, happens instantaneously when the first decoding unit of the current picture is removed from the CPB and proceeds as follows:

When poc_reset_idc of the current picture is greater than 0 and the current access unit is the first access unit in a POC resetting period, all pictures in the DPB that do not belong to the current access unit and that are marked as "needed for output" are output, starting with pictures with the smallest value of PicOrderCntVal of all pictures excluding those in the current access unit in the DPB, in ascending order of the PicOrderCntVal values, and pictures with the same value of PicOrderCntVal are output in in ascending order of the nuh_layer_id values. When a picture is output, it is cropped using the conformance cropping window specified in the active SPS for the picture, the cropped picture is output, and the picture is marked as "not needed for output".

The decoding processes for picture order count and RPS are invoked. When decoding a CVS conforming to one or more of the profiles specified in Annex A using the decoding process specified in clauses 2 through 10, the decoding processes for picture order count and RPS that are invoked are as specified in subclauses 8.3.1 and 8.3.2, respectively. When decoding a CVS conforming to one or more of the profiles specified in Annex G or H using the decoding process specified in Annex F, and Annex G or H, the decoding processes for picture order count and RPS that are invoked are as specified in subclauses F.8.3.1 and F.8.3.2, respectively.

If the current picture is an IRAP picture with NoRaslOutputFlag equal to 1, or the base layer picture in the current access unit is an IRAP picture with NoRaslOutputFlag equal to 1 and NoClrasOutputFlag is equal to 1, the following ordered steps are applied:

1. The variable NoOutputOfPriorPicsFlag is derived for the decoder under test as follows:

If the current picture is a CRA picture with NoRaslOutputFlag equal to 1, NoOutputOfPriorPicsFlag is set equal to 1 (regardless of the value of no_output_of_prior_pics_flag).

Otherwise, if the current picture is an IRAP picture with NoRaslOutputFlag equal to 1 and the value of pic_width_in_luma_samples, pic_height_in_luma_samples, or sps_max_dec_pic_buffering_minus1[HighestTid] derived from the active SPS for the current layer is different from the value of pic_width_in_luma_samples, pic_height_in_luma_samples, or sps_max_dec_pic_buffering_minus1[HighestTid], respectively, derived from the SPS that was active for the current layer when decoding the preceding picture in the current layer, NoOutputOfPriorPicsFlag may (but should not) be set to 1 by the decoder under test, regardless of the value of no_output_of_prior_pics_flag.

NOTE—Although setting NoOutputOfPriorPicsFlag equal to no_output_of_prior_pics_flag is preferred under these conditions, the decoder under test is allowed to set NoOutputOfPriorPicsFlag to 1 in this case.

Otherwise, if the current picture is an IRAP picture with NoRaslOutputFlag equal to 1, NoOutputOfPriorPicsFlag is set equal to no_output_of_prior_pics_flag.

Otherwise (the current picture is not an IRAP picture with NoRaslOutputFlag equal to 1, the base layer picture in the current access unit is an IRAP picture with NoRaslOutputFlag equal to 1, and NoClrasOutputFlag is equal to 1), NoOutputOfPriorPicsFlag is set equal to 1.

2. The value of NoOutputOfPriorPicsFlag derived for the decoder under test is applied for the HRD as follows:

If NoOutputOfPriorPicsFlag is equal to 1, all picture storage buffers in the sub-DPB are emptied without output of the pictures they contain, and the sub-DPB fullness is set equal to 0.

Otherwise (NoOutputOfPriorPicsFlag is equal to 0), all picture storage buffers containing a picture that is marked as "not needed for output" and "unused for reference" are emptied (without output), and all non-empty picture storage buffers in the sub-DPB are emptied by repeatedly invoking the "bumping" process specified in subclause C.5.2.4, and the sub-DPB fullness is set equal to 0.

Otherwise, all picture storage buffers that contain a picture in the current layer and that are marked as "not needed for output" and "unused for reference" are emptied (without output). For each picture storage buffer that is emptied, the sub-DPB fullness is decremented by one. When one or more of the following conditions are true, the "bumping" process specified in subclause C.5.2.4 is invoked repeatedly (*REMOVED: while further decrementing the sub DPB fullness by one for each additional picture storage buffer that is emptied*), until none of the following conditions are true:

The number of access units that contain at least one decoded picture in the DPB marked as "needed for output" is greater than MaxNumReorderPics.

MaxLatencyIncreasePlus1 is not equal to 0 and there is at least one access units that contain at least one decoded picture in the DPB marked as "needed for output" for which the associated variable PicLatencyCount is greater than or equal to MaxLatencyPictures.

The number of pictures in the current layer in the sub-DPB is greater than or equal to MaxDecPicBufferingMinus1+1.

C.5.2.3 Picture Decoding, Marking, Additional Bumping, and Storage

The processes specified in this subclause happen instantaneously when the last decoding unit of picture n is removed from the CPB.

PicOutputFlag is updated as follows:

If the current access unit does not contain a picture at a target output layer and alt_output_layer_flag is equal to 1, the following ordered steps apply:

The list nonOutputLayerPictures is the list of pictures of the access unit with PicOutputFlag equal to 1 and with nuh_layer_id values that are included in the TargetDecLayerIdList and that are not on target output layers.

The picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in a target output layer is set equal to 0.

When the current picture has PicOutputFlag equal to 1, for each picture in the current layer in the sub-DPB that is marked as "needed for output" and follows the current picture in output order, the associated variable PicLatency-Count is set equal to PicLatencyCount+1.

The current picture is considered as decoded after the last decoding unit of the picture is decoded. The current decoded picture is stored in an empty picture storage buffer in the sub-DPB, and the following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

The current decoded picture is marked as "used for short-term reference".

When one or more of the following conditions are true, the "bumping" process specified in subclause C.5.2.4 is invoked repeatedly until none of the following conditions are true:

The number of access units that contain at least one decoded picture in the DPB marked as "needed for output" is greater than MaxNumReorderPics.

MaxLatencyIncreasePlus1 is not equal to 0 and there is at least one access units that contain at least one decoded picture in the DPB marked as "needed for output" for which the associated variable PicLatencyCount is greater than or equal to MaxLatencyPictures.

C.5.2.4 "Bumping" Process

The "bumping" process consists of the following ordered steps:

1. The picture or pictures that are first for output are selected as the ones having the smallest value of PicOrderCntVal of all pictures in the DPB marked as "needed for output".
2. Each of these pictures is, in ascending nuh_layer_id order, cropped, using the conformance cropping window specified in the active SPS for the picture, the cropped picture is output, and the picture is marked as "not needed for output".
3. Each picture storage buffer that contains a picture marked as "unused for reference" and that was one of the pictures cropped and output is emptied and the fullness of the associated sub-DPB is decremented by one.

Example Implementation #2

The example implementation provided below is similar to Example Implementation #1 described above, with no POC reset and additionally including a layer-wise POC defined for all the pictures. All technique suggested in Example Implementation #1 above are applicable except for those reproduced below. The changes proposed in this example implementation are highlighted in italics.

Changes to Slice Segment Header Syntax and Semantics

TABLE 4

Example syntax of slice_segment_header( )

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     i = 0 | |
|     if( num_extra_slice_header_bits > i ) { | |
|       i++ | |
|       discardable_flag | u(1) |
|     } | |
|     if( num_extra_slice_header_bits > i ) { | |
|       i++ | |
|       cross_layer_bla_flag | u(1) |
|     } | |
|     for ( ~~i = 1~~ ; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag = = 1 ) | |
|       colour_plane_id | u(2) |
|     if( ( nuh_layer_id > 0 && !poc_lsb_not_present_flag[ LayerIdxInVPS[ nuh_layer_id ] ] ) || ( nal_unit_type != IDR_W_RADL && nal_unit_type != IDR_N_LP ) ) | |
|       slice_pic_order_cnt_lsb | u(v) |
|     if( nal_unit_type != IDR_W_RADL && nal_unit_type != IDR_N_LP ) { | |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |

TABLE 4-continued

Example syntax of slice_segment_header( )

| slice_segment_header( ) { | Descriptor |
|---|---|
|     short_term_ref_pic_set_idx | u(v) |
|     if( long_term_ref_pics_present_flag ) { | |
|       if( num_long_term_ref_pics_sps > 0 ) | |
|         num_long_term_sps | ue(v) |
|       num_long_term_pics | ue(v) |
|       for( i = 0; i < num_long_term_sps + num_long_term_pics; i++ ) { | |
|         if( i < num_long_term_sps ) { | |
|           if( num_long_term_ref_pics_sps > 1 ) | |
|             lt_idx_sps[ i ] | u(v) |
|         } else { | |
|           poc_lsb_lt[ i ] | u(v) |
|           used_by_curr_pic_lt_flag[ i ] | u(1) |
|         } | |
|         delta_poc_msb_present_flag[ i ] | u(1) |
|         if( delta_poc_msb_present_flag[ i ] ) | |
|           delta_poc_msb_cycle_lt[ i ] | ue(v) |
|       } | |
|     } | |
|     if( sps_temporal_mvp_enabled_flag ) | |
|       slice_temporal_mvp_enabled_flag | u(1) |
|     } | |
|     if( nuh_layer_id > 0 && !all_ref_layers_active_flag && | |
|           NumDirectRefLayers[ nuh_layer_id ] > 0 ) { | |
|       inter_layer_pred_enabled_flag | u(1) |
|       if( inter_layer_pred_enabled_flag && | |
| NumDirectRefLayers[ nuh_layer_id ] > 1) { | |
|         if( !max_one_active_ref_layer_flag ) | |
|           num_inter_layer_ref_pics_minus1 | u(v) |
|         if( NumActiveRefLayerPics != | |
| NumDirectRefLayers[ nuh_layer_id ] ) | |
|           for( i = 0; i < NumActiveRefLayerPics; i++ ) | |
|             inter_layer_pred_layer_idc[ i ] | u(v) |
|       } | |
|     } | |
|     if( sample_adaptive_offset_enabled_flag ) { | |
|       slice_sao_luma_flag | u(1) |
|       slice_sao_chroma_flag | u(1) |
|     } | |
|     if( slice_type = = P || slice_type = = B ) { | |
|       num_ref_idx_active_override_flag | u(1) |
|       if( num_ref_idx_active_override_flag ) { | |
|         num_ref_idx_l0_active_minus1 | ue(v) |
|         if( slice_type = = B ) | |
|           num_ref_idx_l1_active_minus1 | ue(v) |
|       } | |
|       if( lists_modification_present_flag && NumPicTotalCurr > 1 ) | |
|         ref_pic_lists_modification( ) | |
|       if( slice_type = = B ) | |
|         mvd_l1_zero_flag | u(1) |
|       if( cabac_init_present_flag ) | |
|         cabac_init_flag | u(1) |
|       if( slice_temporal_mvp_enabled_flag ) { | |
|         if( slice_type = = B ) | |
|           collocated_from_l0_flag | u(1) |
|         if( ( collocated_from_l0_flag && num_ref_idx_l0_active_minus1 | |
| > 0 ) || | |
|           ( !collocated_from_l0_flag && | |
| num_ref_idx_l1_active_minus1 > 0 ) ) | |
|           collocated_ref_idx | ue(v) |
|       } | |
|       if( ( weighted_pred_flag && slice_type = = P ) || | |
|         ( weighted_bipred_flag && slice_type = = B ) ) | |
|         pred_weight_table( ) | |
|       five_minus_max_num_merge_cand | ue(v) |
|     } | |
|     slice_qp_delta | se(v) |
|     if( pps_slice_chroma_qp_offsets_present_flag ) { | |
|       slice_cb_qp_offset | se(v) |
|       slice_cr_qp_offset | se(v) |
|     } | |
|     if( deblocking_filter_override_enabled_flag ) | |
|       deblocking_filter_override_flag | u(1) |
|     if( deblocking_filter_override_flag ) { | |
|       slice_deblocking_filter_disabled_flag | u(1) |
|       if( !slice_deblocking_filter_disabled_flag ) { | |
|         slice_beta_offset_div2 | se(v) |

TABLE 4-continued

Example syntax of slice_segment_header( )

| slice_segment_header( ) { | Descriptor |
|---|---|
|       slice_tc_offset_div2 | se(v) |
|     } | |
|   } | |
|   if( pps_loop_filter_across_slices_enabled_flag && | |
|     ( slice_sao_luma_flag \|\| slice_sao_chroma_flag \|\| | |
|      !slice_deblocking_filter_disabled_flag ) ) | |
|     slice_loop_filter_across_slices_enabled_flag | u(1) |
| } | |
| if( tiles_enabled_flag \|\| entropy_coding_sync_enabled_flag ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset_minus1[ i ] | u(v) |
|   } | |
| } | |
| if( slice_segment_header_extension_present_flag ) { | |
|   slice_segment_header_extension_length | ue(v) |
|   if( poc_reset_info_present_flag ) | |
|     poc_reset_idc | u(2) |
|   if( poc_reset_idc != 0 ) { | |
|     poc_reset_period_id | u(6) |
|     *poc_lsb_val* | u(v) |
|   } | |
|   if( poc_reset_idc = = 3 ) | |
|     full_poc_reset_flag | u(1) |
|   if( *CraOrBlaPicFlag* ) | |
|     poc_msb_val | ue(v) |
|   while( more_data_in_slice_segment_header_extension( ) ) | |
|     slice_segment_header_extension_data_bit | u(1) |
| } | |
| byte_alignment( ) | |
| } | | poc_lsb_val specifies a value that may be used to derive the picture order count or layer-wise picture order count of the current picture. The length of the poc_lsb_val syntax element is log 2_max_pic_order_cnt_lsb_minus4+4 bits.

It is a requirement of bitstream conformance that, when poc_reset_idc is equal to 3, and the previous picture picA in decoding order that is in the same layer as the current picture, that has poc_reset_idc equal to 1 or 2, and that belongs to the same POC resetting period is present in the bitstream, picA shall be the same picture as the previous picture in decoding order that is in the same layer as the current picture, that is not a RASL picture, a RADL picture or a sub-layer non-reference picture, and that has TemporalId equal to 0 and discardable_flag equal to 0, and the value of poc_lsb_val of the current picture shall be equal to the value of slice_pic_order_cnt_lsb of picA.

C.1.1.1 Changes to Decoding Process of Picture Order Count Decoding Process for Picture Order Count Output of this process is PicOrderCntVal, the picture order count of the current picture, and LayerWisePicOrderCntVal, the layer-wise picture order count of the current picture.

Picture order counts are used to identify pictures, for deriving motion parameters in merge mode and motion vector prediction, and for decoder conformance checking (see subclause C.5).

Each coded picture is associated with a picture order count variable, denoted as PicOrderCntVal, and a layer-wise picture order count variable, denoted as LayerWisePicOrderCntVal.

If FirstPicInLayerDecodedFlag[nuh_layer_id] is equal to 1 and the current picture is a POC resetting picture, the following applies:

The variables pocLsbVal, lwPocMsb, and lwPocLsb are derived as follows:

```
if(CraOrBlaPicFlag)
    prevLwPicOrderCntLsb = PrevLwPicOrderCntReset
[ nuh_layer_id ] & ( MaxPicOrderCntLsb − 1 )
    prevLwPicOrderCntMsb = PrevLwPicOrderCntReset
[ nuh_layer_id ] − prevPicOrderCntLsb
    lwPocMsb = prevLwPicOrderCntMsb + ( poc_msb_val *
MaxPicOrderCntLsb )
else {
    prevLwPicOrderCntLsb =
PrevLwPicOrderCnt[ nuh_layer_id ] & ( MaxPicOrderCntLsb − 1 )
    prevLwPicOrderCntMsb =
PrevLwPicOrderCnt[ nuh_layer_id ] − prevPicOrderCntLsb
    lwpocMsbDelta = getCurrMsb( poc_lsb_val,
prevLwPicOrderCntLsb, prevPicOrderCntMsb, MaxPicOrderCntLsb )
}
```

LayerWisePicOrderCntVal=lwPocLsb+poc_lsb_val

The PicOrderCntVal of each picture that is in the DPB and belongs to the same layer as the current picture is decremented by DeltaPocVal.

The PicOrderCntVal of the current picture is derived as follows:

```
if( poc_reset_idc = = 1 )
    PicOrderCntVal = slice_pic_order_cnt_lsb
else if( poc_reset_idc = = 2 )
    PicOrderCntVal = 0
else { // poc_reset_idc = = 3
    PicOrderCntMsb = getCurrMsb( slice_pic_order_cnt_lsb,
full_poc_reset_flag ? 0 : poc_lsb_val, 0, MaxPicOrderCntLsb )
```

-continued

```
    PicOrderCntVal = PicOrderCntMsb + slice_pic_order_cnt_lsb
    LayerWisePicOrderCntVal = LayerWisePicOrderCntVal +
       PicOrderCntVal
}
```

The value of PrevPicOrderCnt[nuh_layer_id] is derived as follows:

If the current picture is not a RASL picture, a RADL picture, or a sub-layer non-reference picture, and the current picture has TemporalId equal to 0 and discardable_flag equal to 0, PrevPicOrderCnt[nuh_layer_id] is set equal to PicOrderCntVal.

Otherwise when poc_reset_idc is equal to 3, PrevPicOrderCnt[nuh_layer_id] is set equal to full_poc_reset_flag? 0:poc_lsb_val.

The value of PrevLwPicOrderCnt[nuh_layer_id] and PrevLwPicOrderCntReset[nuh_layer_id] are derived as follows:

If the current picture is not a RASL picture, a RADL picture, or a sub-layer non-reference picture, and the current picture has TemporalId equal to 0 and discardable_flag equal to 0, PrevLwPicOrderCnt[nuh_layer_id] is set equal to LayerWisePicOrderCntVal and PrevLwPicOrderCntReset[nuh_layer_id] is set equal to LayerWisePicOrderCntVal.

Otherwise, the following applies:

The PicOrderCntVal of the current picture is derived as follows:

```
if( !FirstPicInLayerDecodedFlag[ nuh_layer_id ] ) {
    if( poc_reset_idc = = 1 )
        PicOrderCntVal = slice_pic_order_cnt_lsb
    else if( poc_reset_idc = = 2 )
        PicOrderCntVal = 0
    else if( poc_reset_idc = = 3 ) {
        PicOrderCntMsb = getCurrMsb(slice_pic_order_cnt_lsb,
full_poc_reset_flag ? 0 : poc_lsb_val,
                    0, MaxPicOrderCntLsb )
        PicOrderCntVal = PicOrderCntMsb + slice_pic_order_cnt_lsb
    } else {
        if( vps_poc_msb_present_flag && CraOrBlaPicFlag ) {
            PicOrderCntMsb = poc_msb_val * MaxPicOrderCntLsb
            PicOrderCntVal = PicOrderCntMsb +
            slice_pic_order_cnt_lsb
        }
        else
            PicOrderCntVal = slice_pic_order_cnt_lsb
    }
} else {
    if( vps_poc_msb_present_flag && CraOrBlaPicFlag )
        PicOrderCntMsb = poc_msb_val * MaxPicOrderCntLsb
    else if( the current picture is an IRAP picture with NoRaslOutputFlag
equal to 1 )
        PicOrderCntMsb = 0
    else {
        prevPicOrderCntLsb =
PrevPicOrderCnt[ nuh_layer_id ] & ( MaxPicOrderCntLsb − 1 ).
        prevPicOrderCntMsb =
PrevPicOrderCnt[ nuh_layer_id ] − prevPicOrderCntLsb
        PicOrderCntMsb = getCurrMsb( slice_pic_order_cnt_lsb,
prevPicOrderCntLsb, prevPicOrderCntMsb, MaxPicOrderCntLsb )
    }
    PicOrderCntVal = PicOrderCntMsb + slice_pic_order_cnt_lsb
}
```

The LayerWisePicOrderCntVal of the current picture is derived as follows:

```
if( !FirstPicInLayerDecodedFlag[ nuh_layer_id ] )
    LayerWisePicOrderCntVal = PicOrderCntVal
else {
    if( the current picture is a CRA picture or a BLA picture )
        LayerWisePicOrderCntVal = PrevLwPicOrderCntReset[
nuh_layer_id ] + PicOrderCntVal
    else if( the current picture is an IDR )
        LayerWisePicOrderCntVal = PrevLwPicOrderCntReset[
nuh_layer_id ] + (poc_msb_val * MaxPicOrderCntLsb )
    else
        LayerWisePicOrderCntVal = PrevLwPicOrderCnt[
nuh_layer_id ] + ( PicOrderCntVal +
                PrevPicOrderCnt[ nuh_layer_id ] )
}
```

The value of PrevPicOrderCnt[nuh_layer_id] is derived as follows:

If the current picture is not a RASL picture, a RADL picture or a sub-layer non-reference picture, and the current picture has TemporalId equal to 0 and discardable_flag equal to 0, PrevPicOrderCnt[nuh_layer_id] is set equal to PicOrderCntVal.

Otherwise when FirstPicInLayerDecodedFlag[nuh_layer_id] is equal to 0 and poc_reset_idc is equal to 3, PrevPicOrderCnt[nuh_layer_id] is set equal to full_poc_reset_flag? 0:poc_lsb_val The value of PrevLwPicOrderCnt[nuh_layer_id] is derived as follows:

If the current picture is not a RASL picture, a RADL picture or a sub-layer non-reference picture, and the current picture has TemporalId equal to 0 and discardable_flag equal to 0, PrevLwPicOrderCnt[nuh_layer_id] is set equal to LayerWisePicOrderCntVal.

The value of PicOrderCntVal shall be in the range of $-2^{31}$ to $2^{31}-1$, inclusive. In one CVS, the PicOrderCntVal values for any two coded pictures in the same layer shall not be the same.

The value of LayerWisePicOrderCntVal shall be in the range of $-2^{31}$ to $2^{31}-1$, inclusive. LayerWisePicOrderCntVal values for any two coded pictures shall not be the same within a sequence of pictures with the same nuh_layer_id value, in decoding order, starting from an access unit containing an IRAP picture with NoClrasOutputFlag equal to 1, inclusive, until the end of the bitstream or the next an access unit containing an IRAP picture with NoClrasOutputFlag equal to 1, exclusive, whichever is earlier in decoding order.

The function LayerWisePicOrderCnt(picX) is specified as follows:

LayerWisePicOrderCnt(picX)=LayerWisePicOrderCntVal of the picture picX

The function DiffPicOrderCnt(picA, picB) is specified as follows:

DiffPicOrderCnt(picA,picB)=LayerWisePicOrderCnt(picA)−LayerWisePicOrderCnt(picB)

The bitstream shall not contain data that result in values of DiffPicOrderCnt(picA, picB) used in the decoding process that are not in the range of $-2^{15}$ to $2^{15}-1$, inclusive.

NOTE—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to decode video information, the apparatus comprising:
a memory configured to store video data associated with a first video layer having a current picture; and
at least one processor in communication with the memory, the at least one processor configured to:
decode a picture order count (POC) most significant bit (MSB) cycle value in a bitstream, wherein the POC MSB cycle value is associated with the current picture and indicative of a difference between (a) MSBs of a first POC of a previous picture in the first video layer that precedes the current picture in decoding order and (b) MSBs of a second POC of the current picture, wherein the previous picture is a closer one of two pictures relative to the current picture in decoding order, the two pictures being (i) a previous POC-resetting picture in the first video layer indicating a POC reset and (ii) a previous instantaneous decoder refresh (IDR) picture in the first video layer;
determine whether the current picture is associated with a POC reset;
based on a determination that the current picture is associated with a POC reset, update POC values of all pictures in a decoded picture buffer (DPB) that are in the first video layer based on the POC MSB cycle value associated with the current picture;
based on a determination that the current picture is not associated with a POC reset, determine the MSBs of the second POC of the current picture based on the POC MSB cycle value associated with the current picture; and
decode the current picture in the bitstream.

2. The apparatus of claim 1, wherein the current picture is one of a clean random access (CRA) picture or a broken link access (BLA) picture.

3. The apparatus of claim 1, wherein a video parameter set associated with the first video layer includes a flag or syntax element that indicates whether the POC MSB cycle value is signaled in the bitstream in association with the current picture.

4. The apparatus of claim 1, wherein the current picture is an IDR picture.

5. The apparatus of claim 1, wherein the apparatus comprises a decoder, wherein the at least one processor is further configured to receive the POC MSB cycle value in association with the current picture in the bitstream.

6. The apparatus of claim 1, wherein the apparatus comprises a device selected from a group consisting of: a computer, a notebook, a laptop computer, a tablet computer, a set-top box, a telephone handset, a smart phone, a smart pad, a television, a camera, a display device, a digital media player, a video gaming console, or an in-car computer.

7. A method of decoding video information, the method comprising:
   decoding a picture order count (POC) most significant bit (MSB) cycle value in a bitstream, wherein the POC MSB cycle value is associated with a current picture in a first video layer and indicative of a difference between (a) MSBs of a first POC of a previous picture in the first video layer that precedes the current picture in decoding order and (b) MSBs of a second POC of the current picture, wherein the previous picture is a closer picture of two pictures relative to the current picture in decoding order, the two pictures being (i) a previous POC-resetting picture in the first video layer indicating a POC reset and (ii) a previous instantaneous decoder refresh (IDR) picture in the first video layer;
   determining whether the current picture is associated with a POC reset;
   performing one of (i) based on determining that the current picture is associated with a POC reset, updating POC values of all pictures in a decoded picture buffer (DPB) that are in the first video layer based on the POC MSB cycle value associated with the current picture, or (ii) based on determining that the current picture is not associated with a POC reset, determining the MSBs of the second POC of the current picture based on the POC MSB cycle value associated with the current picture; and
   decoding the current picture in the bitstream.

8. The method of claim 7, wherein the current picture is one of a clean random access (CRA) picture or a broken link access (BLA) picture.

9. The method of claim 7, wherein a video parameter set associated with the first video layer includes a flag or syntax element that indicates whether the POC MSB cycle value is signaled in the bitstream in association with the current picture.

10. The method of claim 7, wherein the current picture is an IDR picture.

11. A non-transitory computer readable medium comprising code that, when executed, causes an apparatus to:
    store video data associated with a first video layer having a current picture;
    decode a picture order count (POC) most significant bit (MSB) cycle value in a bitstream, wherein the POC MSB cycle value is associated with the current picture and indicative of a difference between (a) MSBs of a first POC of a previous picture in the first video layer that precedes the current picture in decoding order and (b) MSBs of a second POC of the current picture, wherein the previous picture is a closer picture of two pictures relative to the current picture in decoding order, the two pictures being (i) a previous POC-resetting picture in the first video layer indicating a POC reset and (ii) a previous instantaneous decoder refresh (IDR) picture in the first video layer;
    determine whether the current picture is associated with a POC reset;
    perform one of (i) update, based on a determination that the current picture is associated with a POC reset, POC values of all pictures in a decoded picture buffer (DPB) that are in the first video layer based on the POC MSB cycle value associated with the current picture, or (ii) determine, based on a determination that the current picture is not associated with a POC reset, the MSBs of the second POC of the current picture based on the POC MSB cycle value associated with the current picture; and
    decode the current picture in the bitstream.

12. The computer readable medium of claim 11, wherein the code further causes the apparatus to:
    based on a determination that the current picture is associated with a POC reset, update POC values of all pictures in a decoded picture buffer (DPB) that are in the first video layer based on the POC MSB cycle value associated with the current picture.

13. A video coding device configured to decode video information, the video coding device comprising:
    means for storing video data associated with a first video layer having a current picture;
    means for decoding a picture order count (POC) most significant bit (MSB) cycle value in a bitstream, wherein the POC MSB cycle value is associated with the current picture and indicative of a difference between (a) MSBs of a first POC of a previous picture in the first video layer that precedes the current picture in decoding order and (b) MSBs of a second POC of the current picture, wherein the previous picture is a closer picture of two pictures relative to the current picture in decoding order, the two pictures being (i) a previous POC-resetting picture in the first video layer indicating a POC reset and (ii) a previous instantaneous decoder refresh (IDR) picture in the first video layer;
    means for determining whether the current picture is associated with a POC reset;
    means for performing one of (i) updating, based on a determination that the current picture is associated with a POC reset, POC values of all pictures in a decoded picture buffer (DPB) that are in the first video layer based on the POC MSB cycle value associated with the current picture, or (ii) determining, based on a determination that the current picture is not associated with a POC reset, the MSBs of the second POC of the current picture based on the POC MSB cycle value associated with the current picture; and
    means for decoding the current picture in the bitstream.

14. The video coding device of claim 13, further comprising:
    means for updating, based on a determination that the current picture is associated with a POC reset, POC values of all pictures in a decoded picture buffer (DPB) that are in the first video layer based on the POC MSB cycle value associated with the current picture.

15. The apparatus of claim 1,
    wherein the at least one processor is further configured to:
    determine that at least one picture that follows a second current picture in decoding order is to be output before at least one other picture that precedes the second current picture in decoding order; and
    based on the determination that at least one picture that follows the second current picture in decoding order is to be output before at least one other picture that precedes the second current picture in decoding order, refrain from indicating a POC reset in association with the second current picture.

16. The method of claim 7, further comprising:

determining that at least one picture that follows a second current picture in decoding order is to be output before at least one other picture that precedes the second current picture in decoding order; and based on determining that at least one picture that follows the second current picture in decoding order is to be output before at least one other picture that precedes the second current picture in decoding order, refraining from indicating a POC reset in association with the second current picture.

17. The computer readable medium of claim 11, wherein the code further causes the apparatus to:

determine that at least one picture that follows a second current picture in decoding order is to be output before at least one other picture that precedes the second current picture in decoding order; and based on the determination that at least one picture that follows the second current picture in decoding order is to be output before at least one other picture that precedes the second current picture in decoding order, refrain from indicating a POC reset in association with the second current picture.

18. The video coding device of claim 13, the video coding device further comprising:

means for determining that at least one picture that follows a second current picture in decoding order is to be output before at least one other picture that precedes the second current picture in decoding order; and means for refraining, based on the determination that at least one picture that follows the second current picture in decoding order is to be output before at least one other picture that precedes the second current picture in decoding order, from indicating a POC reset in association with the second current picture.

* * * * *